United States Patent
Hasting

(10) Patent No.: US 12,397,936 B2
(45) Date of Patent: Aug. 26, 2025

(54) VORTEX DRONE

(71) Applicant: Angel Aerial Systems, Inc., Cincinnati, OH (US)

(72) Inventor: William Hasting, Cincinnati, OH (US)

(73) Assignee: Angel Aerial Systems, Inc., Cincinnati, OH (US)

( * ) Notice: Subject to any disclaimer, the term of this patent is extended or adjusted under 35 U.S.C. 154(b) by 0 days.

(21) Appl. No.: 18/642,472

(22) Filed: Apr. 22, 2024

(65) Prior Publication Data

US 2024/0391613 A1   Nov. 28, 2024

Related U.S. Application Data

(60) Provisional application No. 63/536,252, filed on Sep. 1, 2023, provisional application No. 63/498,586, filed on Apr. 27, 2023.

(51) Int. Cl.
| | |
|---|---|
| B64U 10/20 | (2023.01) |
| B64C 3/38 | (2006.01) |
| B64C 29/02 | (2006.01) |
| B64C 37/02 | (2006.01) |
| B64U 20/87 | (2023.01) |
| B64U 30/12 | (2023.01) |
| B64U 50/30 | (2023.01) |

(Continued)

(52) U.S. Cl.
CPC ............ *B64U 10/20* (2023.01); *B64C 3/385* (2013.01); *B64C 29/02* (2013.01); *B64C 37/02* (2013.01); *B64U 20/87* (2023.01); *B64U 30/12* (2023.01); *B64U 50/30* (2023.01); *B64U 2101/30* (2023.01); *B64U 2101/60* (2023.01)

(58) Field of Classification Search
CPC ........ B64U 10/20; B64U 10/13; B64U 20/40; B64U 30/12; B64C 37/02; B64C 3/385; B64C 2211/00
See application file for complete search history.

(56) References Cited

U.S. PATENT DOCUMENTS

| | | |
|---|---|---|
| 9,688,398 B2 | 6/2017 | Page et al. |
| 11,453,492 B2 | 9/2022 | Low et al. |

(Continued)

FOREIGN PATENT DOCUMENTS

| | | | | |
|---|---|---|---|---|
| WO | WO-2016120833 A1 | * | 8/2016 | ......... B64C 29/0033 |
| WO | WO-2018178776 A1 | * | 10/2018 | ........... B64C 39/024 |

OTHER PUBLICATIONS

"Fock-Wulf Triebflügel" (Wikipedia) Sep. 25, 2024 (Sep. 25, 2024) [online] retrieved from https://en.wikipedia.org/wiki/Focke-Wulf_Triebfl%C3%BCgel.

(Continued)

*Primary Examiner* — Joshua D Huson
*Assistant Examiner* — Peter A Taraschi
(74) *Attorney, Agent, or Firm* — Frost Brown Todd LLP; Vance V. VanDrake, III; Alexander J. Johnson

(57) ABSTRACT

An unmanned aerial vehicle comprising a center hub; a plurality of wings securable to the center hub; and one or more propeller systems located on each wing of the plurality of wings. The unmanned aerial vehicle further including one or more actuator systems, wherein each of the one or more propeller systems is independently associated with one actuator system of the one or more actuator systems. Wherein the unmanned aerial vehicle system is operatively configured to be operated in a variety of flight modes.

16 Claims, 19 Drawing Sheets

(51) Int. Cl.
    *B64U 101/30*    (2023.01)
    *B64U 101/60*    (2023.01)

(56) References Cited

U.S. PATENT DOCUMENTS

| | | | |
|---|---|---|---|
| 2006/0022085 A1* | 2/2006 | Ferman | B64C 39/068 244/45 R |
| 2011/0001001 A1 | 1/2011 | Bryant | |
| 2012/0248259 A1 | 10/2012 | Page et al. | |
| 2014/0117149 A1* | 5/2014 | Zhou | B64U 50/19 244/17.23 |
| 2016/0176503 A1* | 6/2016 | Gettinger | B64U 30/12 244/3.27 |
| 2017/0355453 A1 | 12/2017 | Kim et al. | |
| 2018/0067493 A1* | 3/2018 | Pilskalns | B64U 20/87 |
| 2019/0135427 A1 | 5/2019 | Robertson et al. | |
| 2020/0140080 A1* | 5/2020 | Regev | B64C 29/0033 |
| 2021/0171191 A1 | 6/2021 | Castellano Aldave et al. | |
| 2022/0119090 A1* | 4/2022 | Minarik | B64U 10/20 |
| 2023/0065140 A1* | 3/2023 | Blevins | B64U 20/40 |

OTHER PUBLICATIONS

Int'l. Search Report and Written Opinion, Aug. 15, 2024, corresponding Appln. No. PCT/US24/25715, Patent Cooperation Treaty, ISA/US.

Cameron et al., "Performance of a Mach-Scale Coaxial Counter-Rotating Rotor in Hover", Journal of Aircraft, May 2016, pp. 746-755, vol. 53, No. 3.

Rehm, N., "The Spinning Drone Paradox—Part 1", Jul. 20, 2022, retrieved on Jun. 3, 2025, Youtube, [online], https:// www.youtube.com/watch?v=7JH1_ZKV7t4.

Rehm, N., "Is THIS the Most Versatile Aircraft Design? (Forward Flight Testing)—Part 2", Sep. 13, 2022, retrieved on Jun. 3, 2025, Youtube, [online], https://www.youtube.com/watch?v=I3D559DNa04.

Rehm, N., "The Extraordinary Redundancy of Spinning Drones—Part 3", Nov. 8, 2022, retrieved on Jun. 3, 2025, Youtube, [online], https://www.youtube.com/watch?v=taU7mRTnrtY.

Low, J. E. et al., "Design and Dynamic Analysis of Transformable HOvering Rotocraft (THOR)", Jun. 4, 2017, retrieved on Jun. 3, 2025, 2017 IEEE International Conference on Robotics & Automation (ICRA), Singapore, Singapore University of Technology and Design, Youtube, [online], https://youtu.be/EPQdlDy2atY.

Low, J. E. et al., "Design and dynamic analysis of a Transformable Hovering Rotorcraft (THOR)," 2017 IEEE International Conference on Robotics and Automation (ICRA), Singapore, 2017, pp. 6389-6396, doi: 10.1109/ICRA.2017.7989755.

"Individual Blade Control Project", retrieved on Jun. 3, 2025, NASA Aeromechanics NASA Ames Research Center, [online], https://rotorcraft.arc.nasa.gov/Research/Programs/ibc.html.

\* cited by examiner

VORTEX DRONE

CROSS REFERENCE TO RELATED APPLICATIONS

This application claims the priority benefit of U.S. Provisional Patent Application No. 63/498,586, filed Apr. 27, 2023, and U.S. Provisional Patent Application No. 63/536,252, filed Sep. 1, 2023, each hereby being incorporated by reference in their entirety.

TECHNICAL FIELD

An unmanned aerial vehicle (UAV) that may be easily reconfigurable for a variety of missions and payloads.

BACKGROUND

Swarm drone technology is rapidly advancing and has a wide range of potential applications, including search and rescue missions, surveillance, and delivery services. Today, swarm drones are being used for mapping and surveying, construction inspections, and agricultural monitoring. They are also being used in the entertainment industry for creating stunning aerial displays. Swarm drones can be controlled by a single operator, and the drones can communicate with each other in real-time, allowing for coordinated movement and collective decision-making. The current state of swarm drone technology is characterized by significant advancements in hardware, software, and communication systems.

In terms of hardware, swarm drones are becoming more lightweight, agile, and energy-efficient. Newer models are equipped with multiple sensors, cameras, and global positioning systems (GPS), allowing for precise positioning and obstacle avoidance. Some of the latest swarm drone designs also incorporate 3D-printed materials and biomimetic structures, enabling them to fly in complex environments and carry out intricate maneuvers.

The software used to control swarm drones is becoming more sophisticated, allowing for more precise control and autonomous decision-making. Swarm drones can now be programmed to perform complex tasks, such as aerial mapping or search and rescue missions, without human intervention. Some of the latest software solutions also enable real-time monitoring and control of multiple drones simultaneously. Communication systems are also advancing, allowing swarm drones to communicate with each other over long distances and to coordinate their movements in real-time. Overall, the current state of swarm drone technology is promising, and we can expect to see continued innovation and advancements in the coming years.

However, there are still a myriad of issues with current swarm drone technology. Specifically, they face an airframe paradox in that rotorcraft designs are needed for maneuverability, but the flight times required for many of the missions are only achievable with fixed-wing aircraft. Furthermore, the majority of UAVs are designed to be reusable many times and survive harsh conditions including crashes. They typically must provide capacity and power for a number of high-performance payloads. Meeting these design objectives results in high-cost platforms that are too expensive for attributable missions and may need to be recovered. It is currently not economically feasible to employ thousands to tens of thousands of UAVs meeting the desired performance required at the price points of current drones. The cost of each platform must be drastically reduced to employ swarming concepts. This requires a different design approach where drones are engineered for attributable missions, carry a limited number of expendable low-cost sensors or other payloads, while still being able to collaborate with each other (both in strategy and communications as well as mechanically) and provide the resources required for the mission.

Therefore, there is a need in the art for an attributable UAV to have a modular design, have the maneuverability required, while also being able to meet the flight time requirements of most missions.

BRIEF DESCRIPTION OF THE DRAWINGS

Various embodiments will become better understood with regard to the following description, appended claims, and accompanying drawings wherein:

DETAILED DESCRIPTION

Figure 1A:
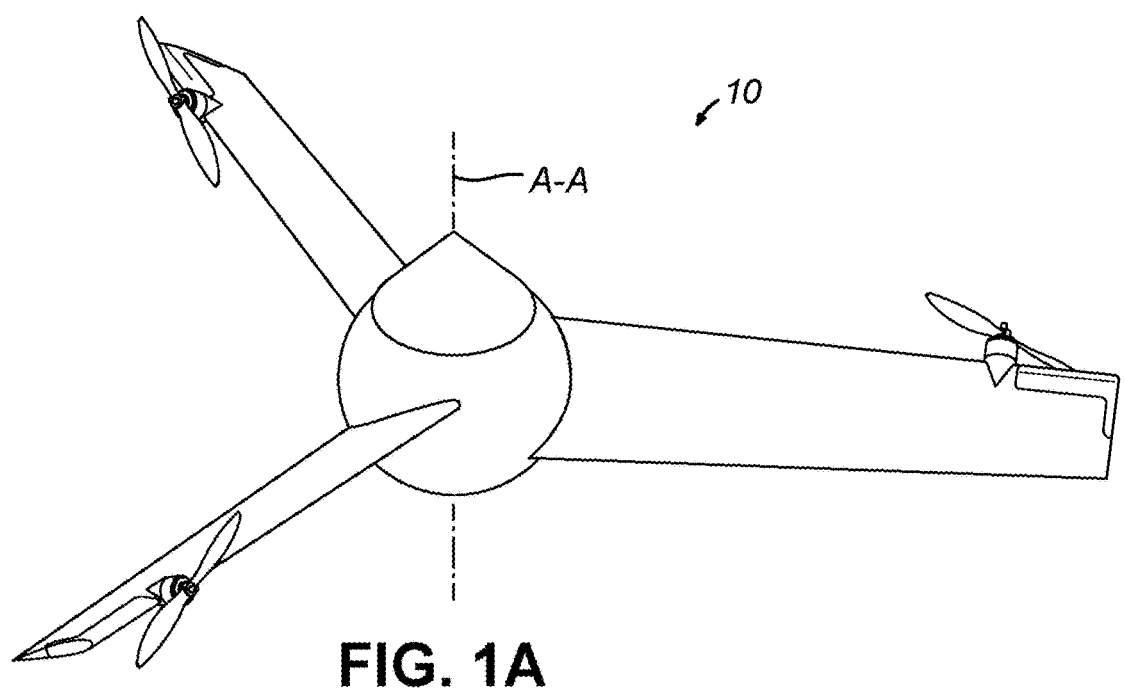
FIG. 1A shows a perspective view of an embodiment of a vortex drone of the present disclosure operating in vortex mode.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings, wherein like numbers indicate the same or corresponding elements throughout the views. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, it should be understood that unless otherwise specified or required by context, any explicit or implicit ordering of steps performed in the execution of a method does not imply that those steps must be performed in the order presented but instead may be performed in a different order or in parallel.

For clarity of disclosure, the terms "proximal" and "distal" are defined herein relative to a central axis of vortex drones of the present disclosure. The term "proximal" refers to the position of an element closer to the central axis of the vortex drone of the present disclosure. The term "distal" refers to the position of an element further away from the central axis of the vortex drone of the present disclosure. In addition, the terms "upper," "lower," "top," and "bottom," are used with respect to the examples and associated figures and are not intended to unnecessarily limit the invention described herein.

Fundamentally, a larger diameter propeller has higher efficiency than a smaller diameter propeller. Helicopter drones have more flight time than quadcopters because it has one large propeller (rotor) instead of four small propellers. However, there are disadvantages/inefficiencies with a helicopter due to the torque generated on the airframe, and the gearbox. Helicopters (and other traditional rotorcraft) have the motor on the main body, which turns a shaft that is connected to the main rotor. However, the torque has to be counteracted by the airframe based on Newton's $3^{rd}$ law of equal and opposite torque. This torque must be counteracted by another movement, which with single-rotor helicopters is typically a tail rotor. However, this extra tail rotor is wasted energy, weight, cost, and complexity. Also, the electric motor (or gas turbine) on traditional helicopters are efficient at high speeds with low torque. However, the main rotor on traditional helicopters requires the shaft to be turning at low speed/high torque to overcome the significant aerodynamic drag loads as well as to avoid the helicopter blades from turning too fast (and the aerodynamic flow going supersonic). A complex and multi-stage gearbox is required to take the turbine/motor output from high speed/low torque to low speed/high torque. This gearbox has power transmission losses, and adds significant weight, cost, and complexity to the airframe.

Vortex drones of the present disclosure avoid the need for a tail rotor because they are spun about their axis by a torque created by a series of propeller systems that generate thrust at the end of a long moment arm. In other words, when vortex drones of the present disclosure are operating in vortex mode (as explained below), the entire airframe turns into one giant propeller. A certain amount of torque is required to overcome the wing aerodynamic drag that is a byproduct of the lift from the wings (whenever lift is created, drag is always created). By maximizing the moment arm by putting the propeller systems at the end of each wing of vortex drones of the present disclosure, the thrust required by each propeller system is minimized, which reduces the power consumption. There is still a small torque from each propulsion motor at the end of each wing, but it is small and handled by a control system logic found within the vortex drones of the present disclosure.

Figure 1B:
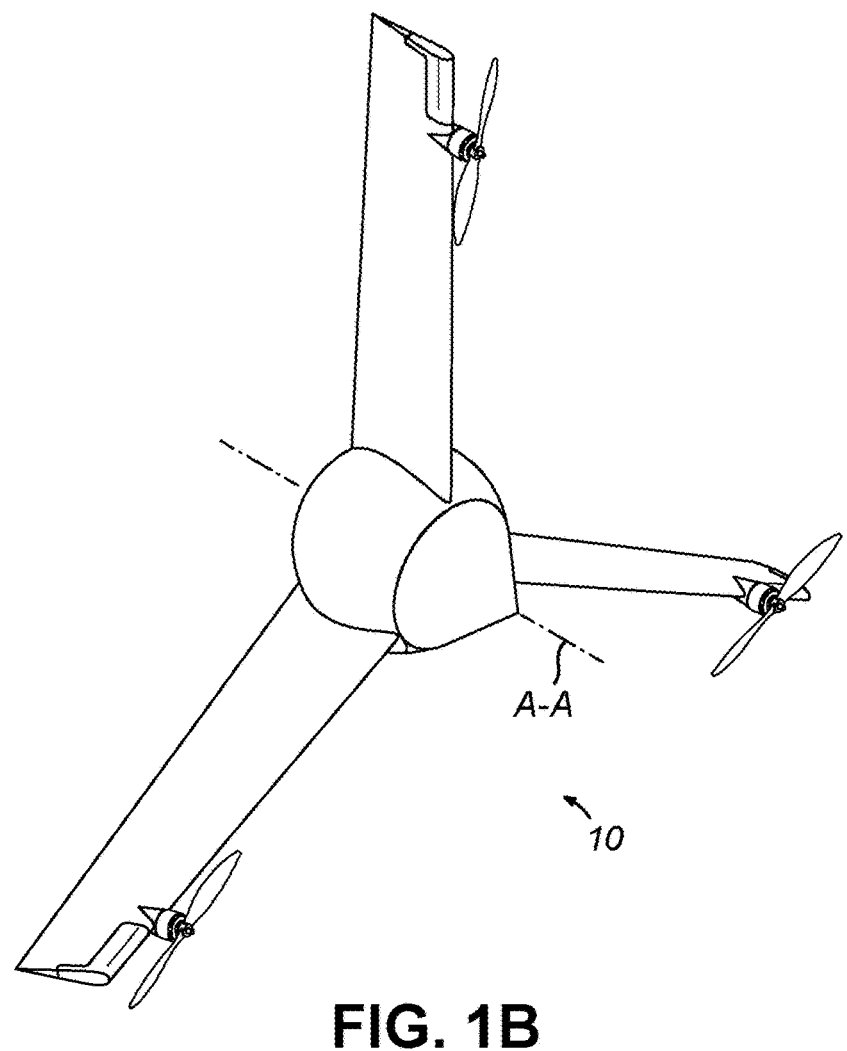
FIG. 1B shows a perspective view of an embodiment of a vortex drone of the present disclosure operating in a fixed-wing mode.
Figure 1C:
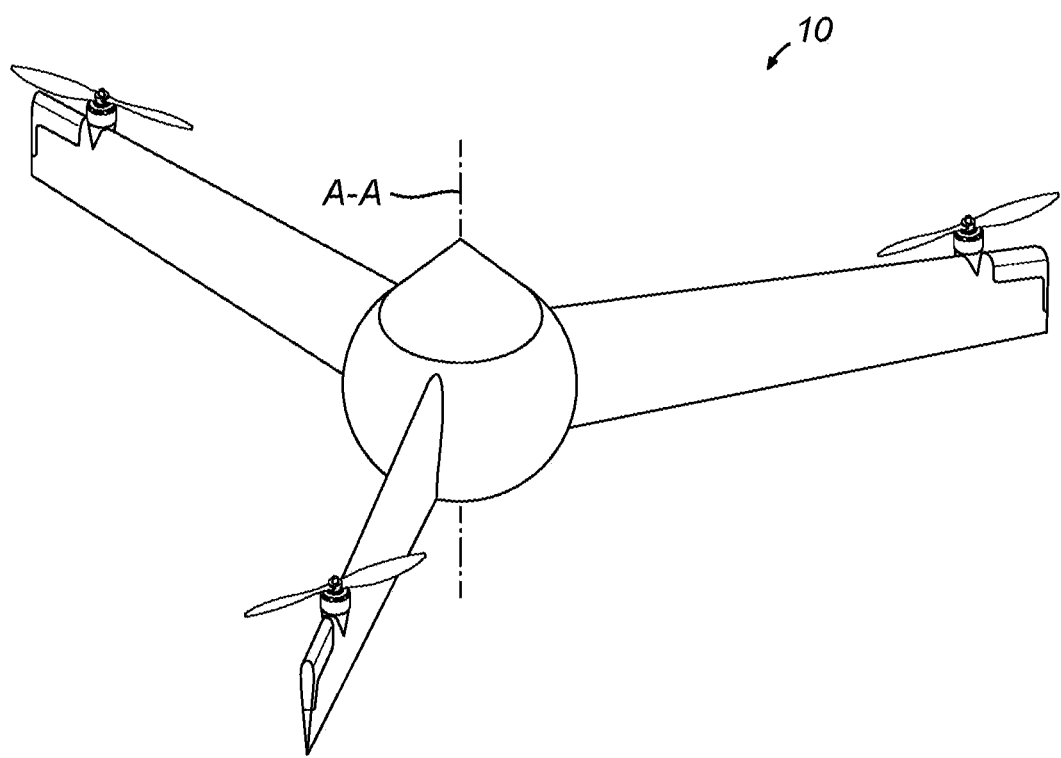
FIG. 1C shows a perspective view of an embodiment of a vortex drone of the present disclosure operating in a tri-copter mode.

In one or more embodiments of the present disclosure, vortex drones 10 include a center hub 18 and a plurality of wings 16. The center hub 18 includes a central axis defined by the line A-A and each wing 16 of the plurality of wings includes a base 15 securable to the center hub 18. Vortex drones 10 of the present disclosure may be operatively configured to operate in a variety of different flight modes. In one or more embodiments, some of the different flight modes include vortex mode as shown in FIG. 1A, a fixed-wing mode as shown in FIG. 1B, and in a tri-copter mode as shown in FIG. 1C. As shown in FIG. 1A, vortex mode is defined by the base 15 of each wing 16 being in a position offset from the central axis A-A of center hub 18. As shown in FIGS. 1B and 1C, both the fixed-wing mode and tri-copter mode are defined by the base 15 of each wing 16 being in a position parallel with the central axis A-A of the center hub 18. The mechanics of how each wing 16 is able to change its position relative to the central axis A-A of the center hub 18 will be discussed below in further detail.

When vortex drone 10 is in tri-copter mode, the wings 16 may be generally perpendicular to the ground, as the lift comes primarily from the propeller systems 12, and gravity must be counteracted. In one or more embodiments, the wings 16 may be modulated slightly to overcome the uneven motor torque of having an odd number of propeller systems 12, but the far majority of the thrust must be opposite the gravitational force.

Each wing of vortex drones of the present disclosure has wings within an airfoil shape, so they need to be in different positions in fixed wing mode to fly. In one or more embodiments, while in fixed wing mode, one of the wings 16 can be perpendicular to the ground with an angle of attack of about 0°, while the other two wings 16 can each be angled up at an angle of attack between 1° and 15°. The angle of attack is defined as "the angle between the chord of an airfoil and the direction of the surrounding undisturbed flow of gas or liquid measured relative to direction of the airflow". Keeping in mind that these are all control surfaces and are subject to be independently articulated to maintain stability of vortex drone 10, as well as to maneuver the vortex drone 10. The overall stability of vortex drone 10 can be a key concept because it's natural state can typically be unstable, and therefore it takes constant corrections to the angle of attack of each wing 16 and to the speed of each propeller system 12 through the use of a Flight Computer several times per second.

In one or more embodiments, when vortex drones of the present disclosure are in vortex mode, the wings are at an angle of attack of between about 5° and about 65°. In one embodiment, when vortex drones of the present disclosure are in vortex mode, the wings are at an angle of attack of about 25° during hover. When lateral movement is required in vortex mode, the angle of attack of each wing may be changed during each rotation.

Figure 1D:
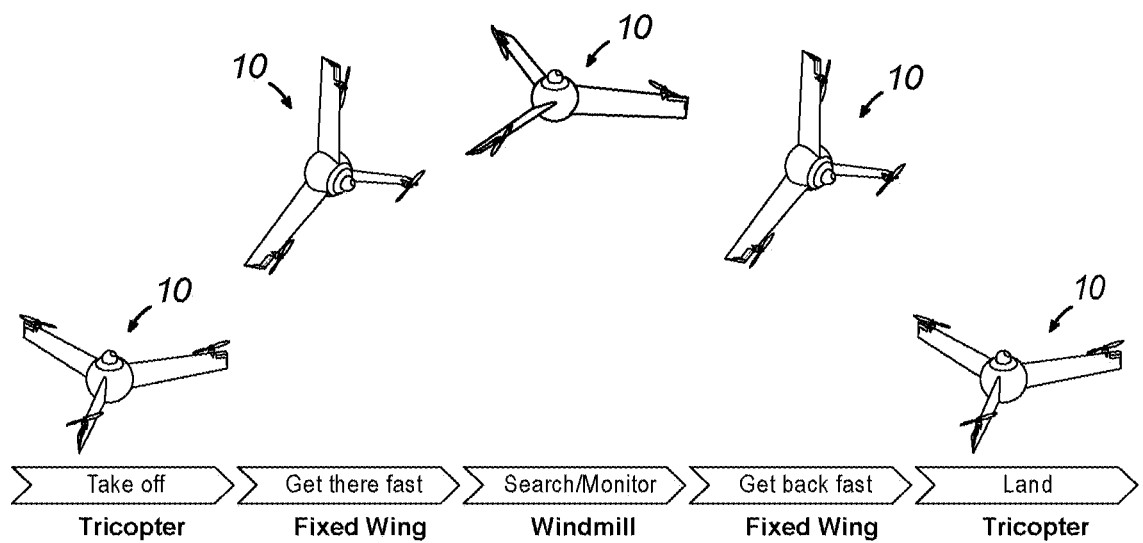
FIG. 1D shows an embodiment of a vortex drone of the present disclosure changing from tri-copter mode to fixed-wing mode, to vortex mode, back to fixed-wing mode, and back again to tri-copter mode.

Vortex mode may allow the vortex drones of the present disclosure to be able to meet long endurance swarm drone missions as the power consumption during vortex mode hover can be up to seven times lower when comparted to vortex drones of the present disclosure operating in tri-copter mode. Vortex mode also allows the vortex drones of the present disclosure to be capable of safely hovering even if two or more engines fail (this may be a key safety feature when flying over the general public and during critical missions). Fixed-wing mode enables the vortex drones of the present disclosure to be able to efficiently travel from point A to point B. FIG. 1D shows how a vortex drone 10 can change between the various flight modes as discussed above.

For example, when a vortex drone 10 takes off, it may be in tri-copter mode. While traveling to its intended destination, vortex drone 10 may be in fixed-wing mode to arrive quickly while achieving optimal energy efficiency while maximizing the time on scene. When in a mission-critical position such as a search zone, for example, vortex drones of the present disclosure may operate in vortex mode to optimize energy efficiency. While in vortex mode, the vortex drones of the present disclosure can move laterally by changing the angle of attack of each wing during each rotation or modulate the motor speed of each propeller on each wing during the rotation to adjust the thrust, or a combination of each dependent on what is most energy efficient. Vortex drones of the present disclosure can return to fixed-wing mode when traveling back to a landing position and may return to tri-copter mode when ready to land.

Figure 2:
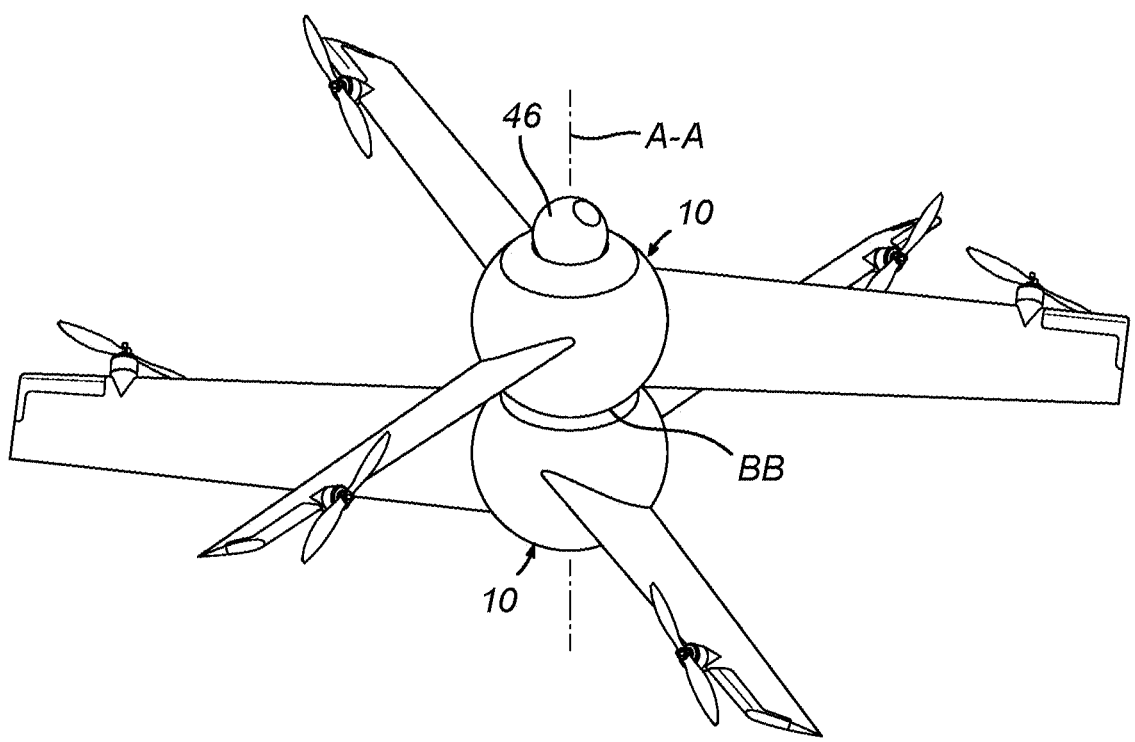
FIG. 2 shows a perspective mode of two vortex drones stacked on top of one another while operating in a counter-rotating manner.

In one or more embodiments, each vortex drone 10 of a plurality of vortex drones may be stackable with another vortex drone 10, such as shown in FIG. 2. In practice, every other vortex drone 10 can counter-rotate with the vortex drone 10 they are adjacently stacked next to. This counter-rotating and stacking option increases efficiency (hover time and payload) by an additional 6-16% compared to if they were flying individually due to the aerodynamic benefit. In other words, two vortex drones that are counter rotating in hover may each consume 90-95% of the power as opposed to if they were hovering individually. Additionally, if each drone can individually lift 20 kg in vortex mode, a counter rotating vortex drone may be able to lift up to 44 kg with the same energy used.

In one or more embodiments, vortex drones 10 of the present disclosure can be utilized to assist in remote communications for search and rescue missions. In such an embodiment, a swarm of vortex drones 10 can autonomously form a link between a service area and the area of interest for a search. The vortex drones 10 can be equipped with a signal repeater for cell phones and if someone is trapped with a cell phone or other signal emitter, the signal may be relayed back to the service area. This method may also be used to form an alternate communication network in military missions or when natural disasters have destroyed standard communication infrastructure. In one or more embodiments, the wings of the vortex drone 10 can include antennas to boost the range of the signal.

Figure 3:
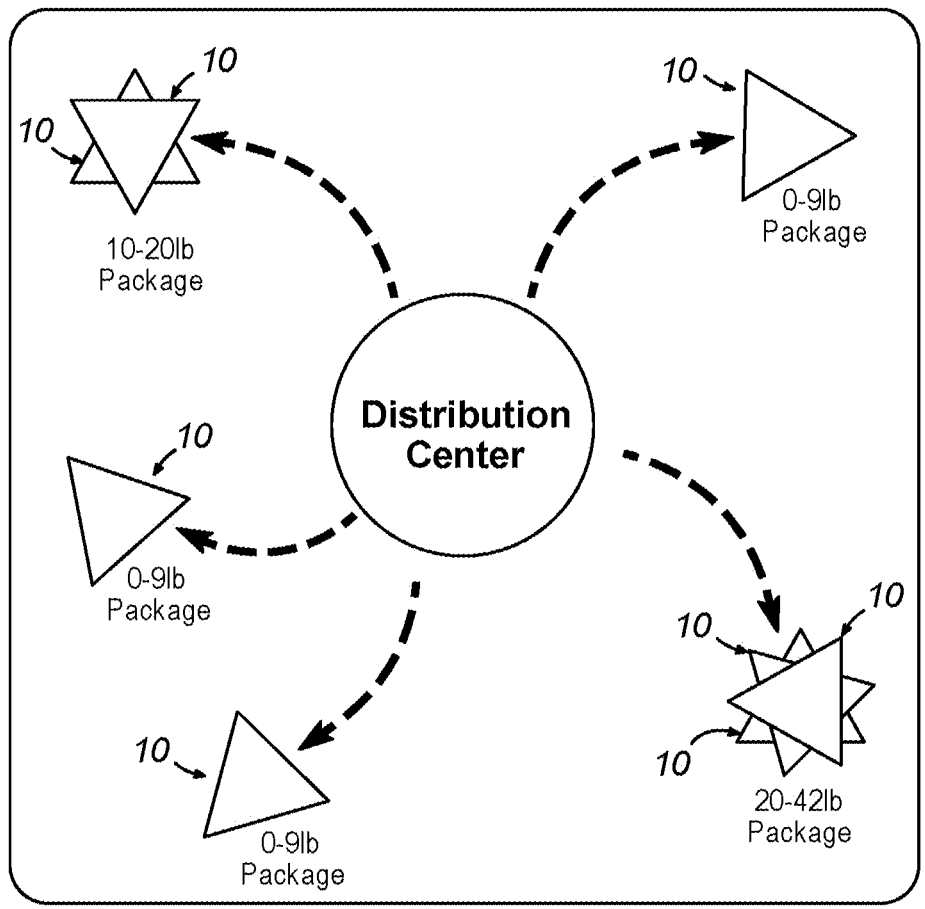
FIG. 3 shows an example embodiment of how vortex drones of the present disclosure can be utilized to deliver a variety of different sized packages from a distribution center by attaching together in a counter rotating fashion.

In one or more embodiments, vortex drones 10 of the present disclosure can be utilized to deliver packages from a distribution center, such as shown in FIG. 3. For example, if a package weighing less than 10 pounds needs to be delivered, a single vortex drone 10 can deliver the package. If a package weighing between 10- and 20-pounds needs to be delivered, two vortex drones 10 can be stacked together and operated in a counter-rotating way as discussed above to deliver the package. And, if a package weighing between 20-43 pounds needs to be delivered, four vortex drones 10 can be stacked together and operated in a counter-rotating way as discussed above to deliver the package. Such a system simplifies flight operations as vortex drones 10 are stackable with one another to deliver larger payloads.

In one or more embodiments, a motorized gimbal, camera, a cable and hook arrangement, or combinations thereof are secured to the underside of the vortex drone 10. In a typical situation, the vortex drone 10 takes off in tri-copter mode, and then switches to a fixed-wing or vortex mode for travel. The motorized gimbal may be able to spin in the opposite direction to keep the camera, cable, hook, and object being carried from spinning relative to the ground.

Figure 4A:
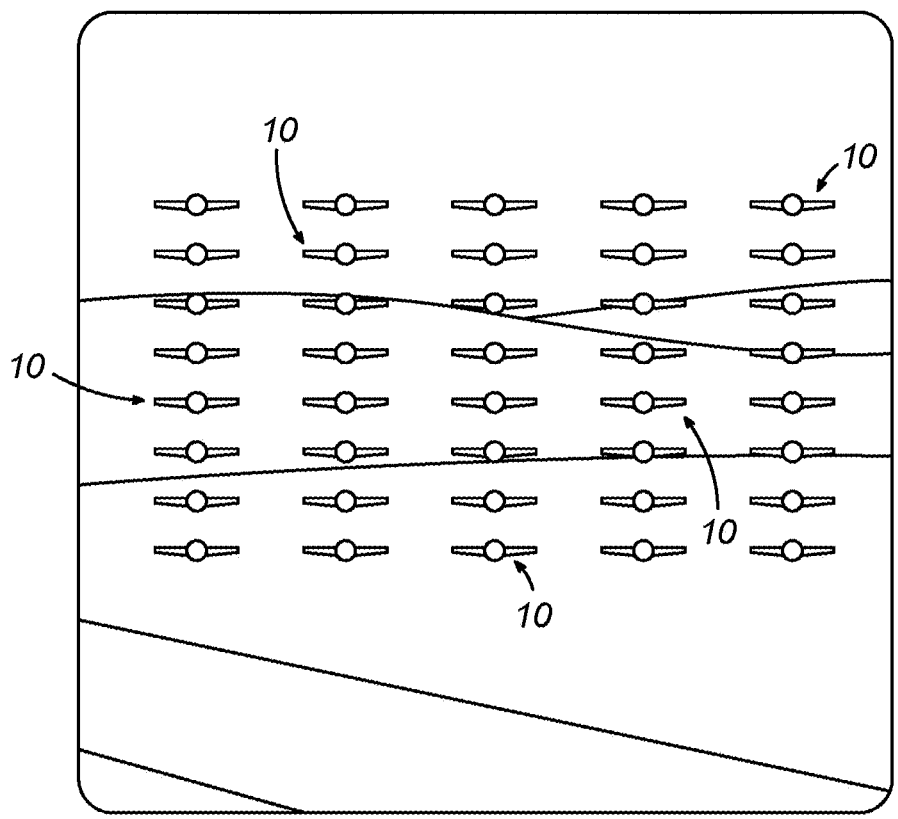
FIG. 4A shows an example embodiment of how vortex drones of the present disclosure can be sent out and controlled as a swarm of vortex drones in a grid in the sky to monitor an area.
Figure 4B:
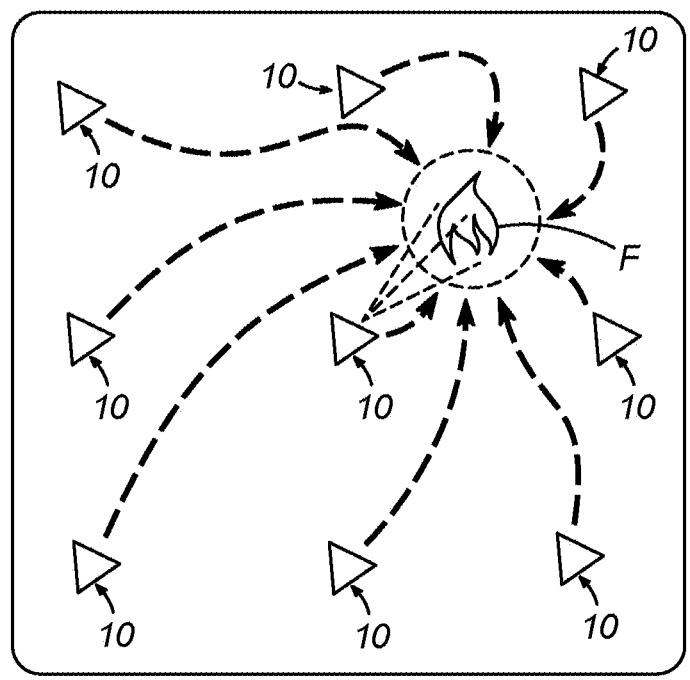
FIG. 4B shows an example embodiment of how vortex drones of the present disclosure can be utilized to detect, and subsequently isolate a small fire prevent the spread of a fire emergency.

In one or more embodiments, vortex drones 10 of the present disclosure can be utilized to monitor and protect areas under high risk of wildfires. For example, as shown in FIG. 4A, a swarm of vortex drones 10 can be set out in an area above a fire and can use real time monitoring from a thermal camera to provide information back to a fire-fighting team a safe distance away. As shown in FIG. 4B, a swarm of vortex drones 10 can also be utilized to actively fight a fire F by starting a controlled burn to isolate the area. Vortex drones 10 of the present disclosure can be equipped with fire starting devices to drop said fire-starting devices ahead of the fire F in order to isolate the fire F so that it doesn't spread, which can allow fire trucks and helicopters to have more time to get to the fire F to extinguish it.

Figure 5:
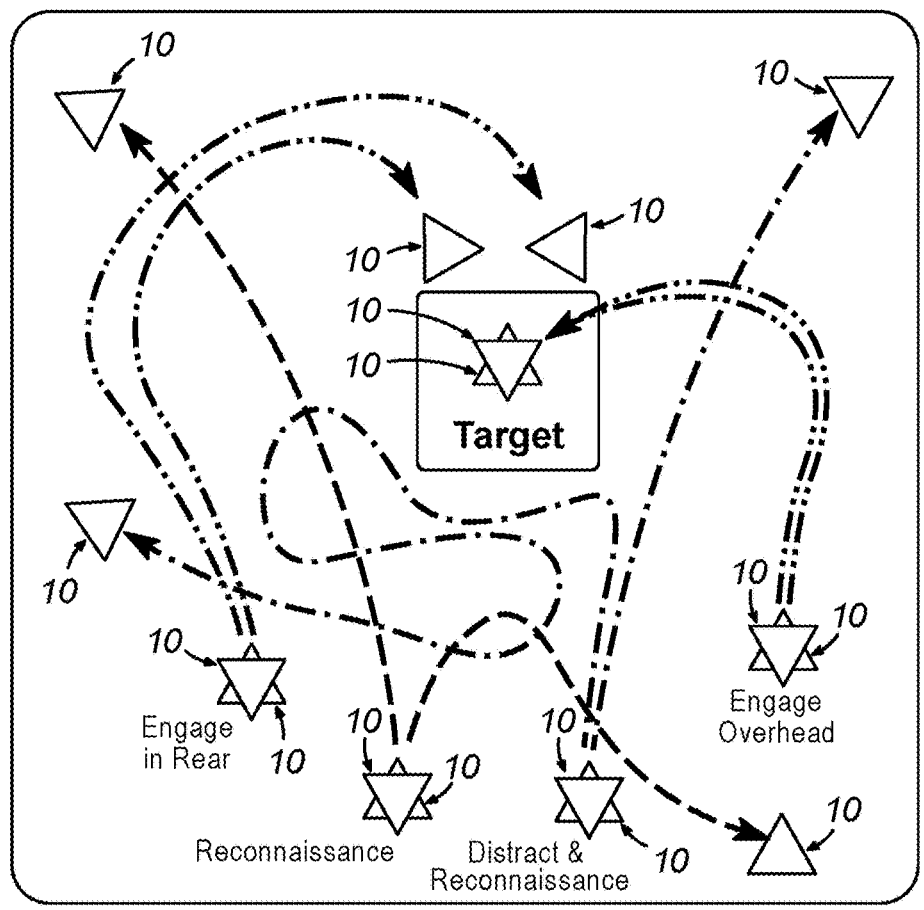
FIG. 5 shows an example embodiment of how vortex drones of the present disclosure can be utilized to engage a target in a military setting.

In one or more embodiments, vortex drones 10 of the present disclosure can be utilized in a military situation. For example, a swarm of vortex drones 10 can be placed in a grid formation over a battlefield, and through the use of LiDAR, radar and camera images, the vortex drones 10 can provide detailed obstacle and landscape information. In one or more embodiments, through the use of detect and react artificial intelligence, the swarm of vortex drones 10 can intelligently engage targets. Intelligent algorithms can be applied to the swarm of vortex drones 10 which can be used to engage targets and overwhelm anti-drone defenses of the opponent. As shown in FIG. 5, the swarm of vortex drones 10 can be singularly deployed, or they can be deployed in a stacked formation as discussed above and separate in mid-air to carry out their designated missions.

Figure 6:
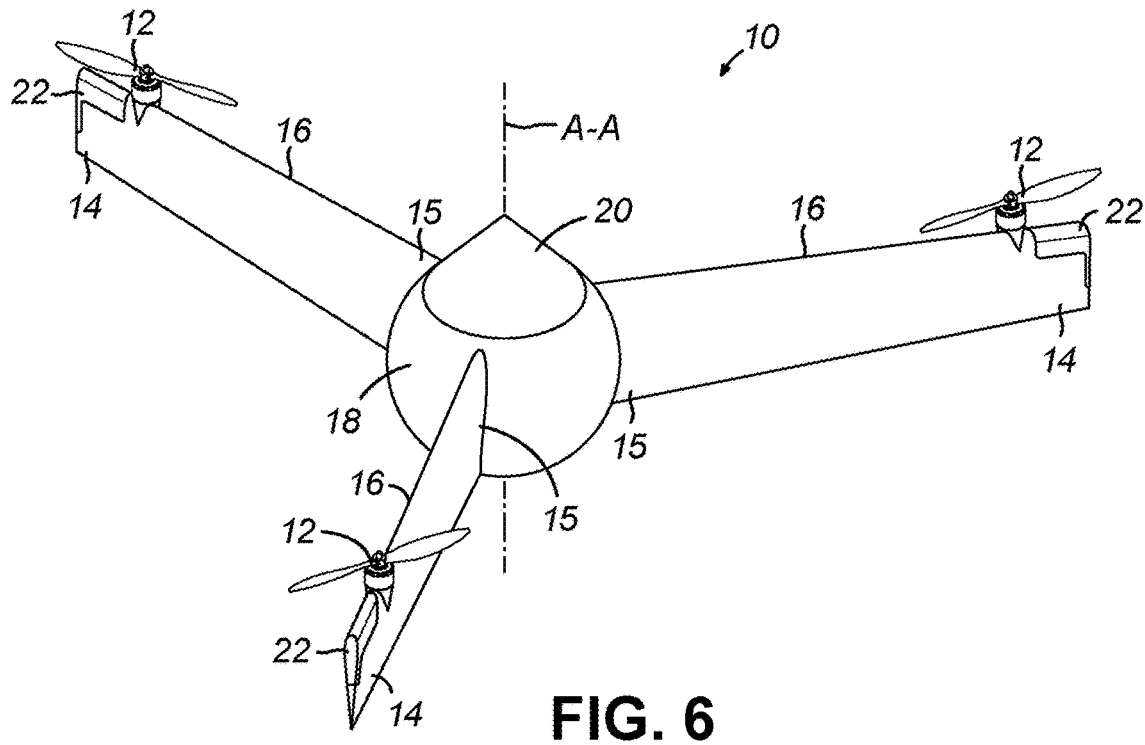
FIG. 6 is a perspective view of various external components of an embodiment of a vortex drone of the present disclosure.

FIG. 6 shows details of various external components of a vortex drone 10. Vortex drone 10 may be equipped with one or more propeller systems located adjacent to an end 14 of each wing 16 of vortex drone 10. Each wing 16 may be secured to a center hub 18, which may be capped with a top hub cap 20 to protect the internal components found within the center hub 18. In one or more embodiments, each wing 16 can also include a wingtip light 22 to allow for night flights. In one or more embodiments, the wingtip lights 22 are configured to turn on and off based on the rotation of each wing 16 to comply with night-time regulations issued by the Federal Aviation Administration (FAA). In one or more embodiments, the wingtip lights 22 can change color or turn on and off based on a clocking position of each wing 16.

Figure 7A:
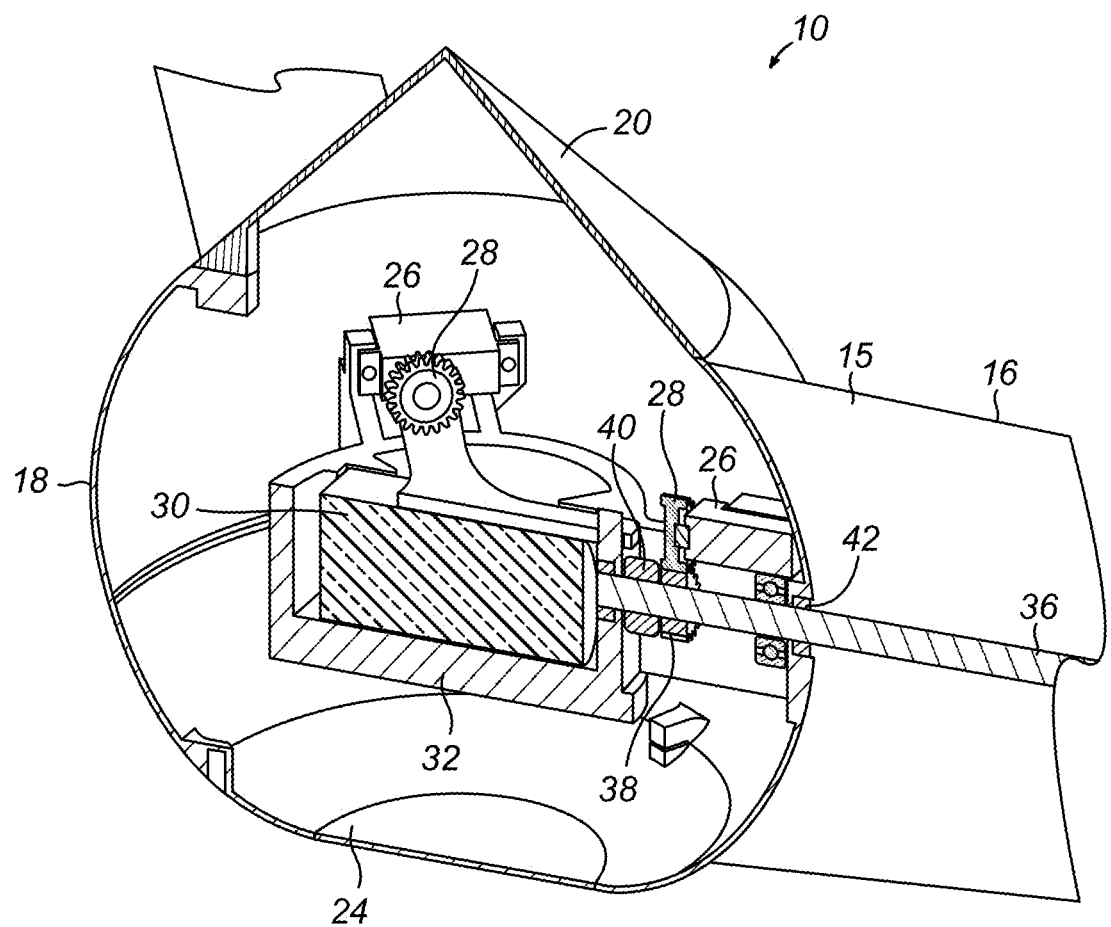
FIG. 7A is a partial cutaway perspective view of various internal components of a central hub of an embodiment of the vortex drone of FIG. 6.
Figure 7B:
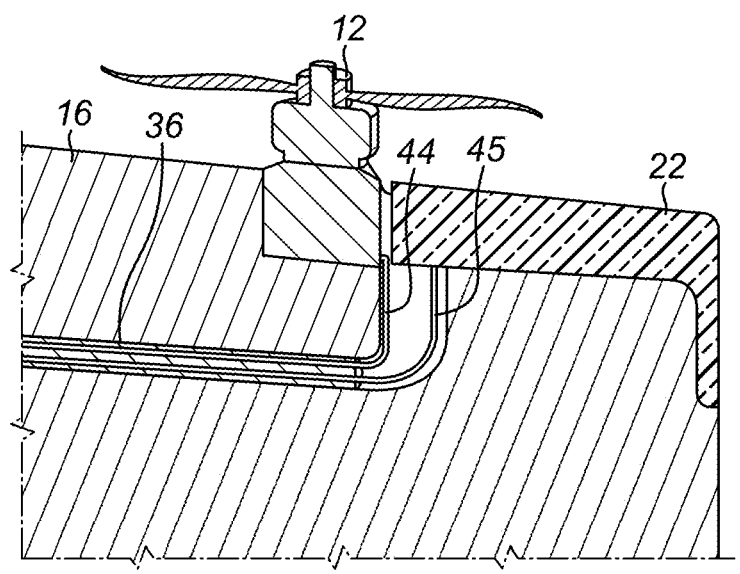
FIG. 7B is a partial cutaway perspective view of various internal components of a wing of an embodiment of the vortex drone of FIG. 6.

FIGS. 7A and 7B show details of various internal components of a vortex drone 10. Center hub 18 includes the top hub cap 20 discussed above, and a bottom hub cap 24, also utilized to protect the internal components found within the center hub 18. Within the center hub 18 is an actuator system. In one or more embodiments, the actuator system includes three servos 26 and three servo gears 28 that operate to independently control the angle of attachment of each wing 16 to center hub 18 and to operate and independently control each propeller system 12 located at the end of each wing 16 by transmitting torque as needed. In one or more embodiments, the propeller systems 12 include both a propeller and a thrust motor. In one or more embodiments, the number of servos 26 and servo gears 28 can coincide with the number of propeller systems 12 located on vortex drone 10. The servos 26 and servo gears 28 are powered by a power source, such as one or more batteries 30. The one or more batteries 30 may be held in place by a battery holder 32. In one or more embodiments, a flight management unit (FMU) (not shown) comprising a plurality of electronic systems needed to control the battery 30, servos 26, and servo gears 28 are mounted underneath the battery 30.

The drone 10 includes a communications air unit receiver (not shown) which may be the source of communication between the vortex drone 10 and the remote control (not shown) utilized to control the drone 10. Also utilized with the control system may be control algorithms. Further included with the FMU of drone 10 are various sensors, including accelerometers, gyroscopes, and GPS, which provide information about the position, orientation, and velocity of drone 10 at any point in time. The remote control works in conjunction with the FMU to operate the drone 10. The remote control may be used by the operator to send commands to the drone 10, such as instructions to take off, land, move in a certain direction, or adjust its altitude. Alternatively, the drone 10 can be autonomously controlled where the operator or swarm AI algorithms command the drone 10 to move from coordinate A to coordinate B, search along a designated flight path or area, return home, or other general commands. In one or more embodiments, the communication link between drone 10 and the ground control unit may be a wireless radio frequency signal or wireless broadband communication signal via the air unit receiver, which allows for real-time transmission of data between the drone 10 and the ground control system.

The control algorithms used are responsible for processing the data from the sensors and the remote control to determine the appropriate actions for the drone 10 to take. These algorithms typically use a combination of feedback control and feedforward control techniques to maintain stability and achieve desired performance. Feedback control involves continuously measuring the current state of the drone 10 and comparing it to a desired state, then adjusting the actions of the drone 10 to reduce any error between the two states. Feedforward control involves anticipating the effects of external disturbances, such as wind or turbulence, and adjusting the actions of drone 10 accordingly to minimize their impact.

Each wing 16 includes a wing shaft 36 connected to a shaft gear 38. The ends of each wing shaft 36 are mounted on a bearing 40 and a retaining collar 42 may additionally be utilized to secure the position of each wing shaft 36. The wiring 44 that runs from the battery 30 through the speed controller of the propeller system 12 may be routed within the wing shaft 36. In embodiments with a wingtip light 22, wiring 45 for the wingtip light 22 can also be routed within the wing shaft 36. In one or more embodiments, each vortex drone 10 can also include a ball bearing connection BB, as shown in FIG. 2, located on both the top hub cap 20 and the bottom hub cap 24 to allow for a plurality of vortex drones 10 to stack onto one another as discussed above.

Figure 8:
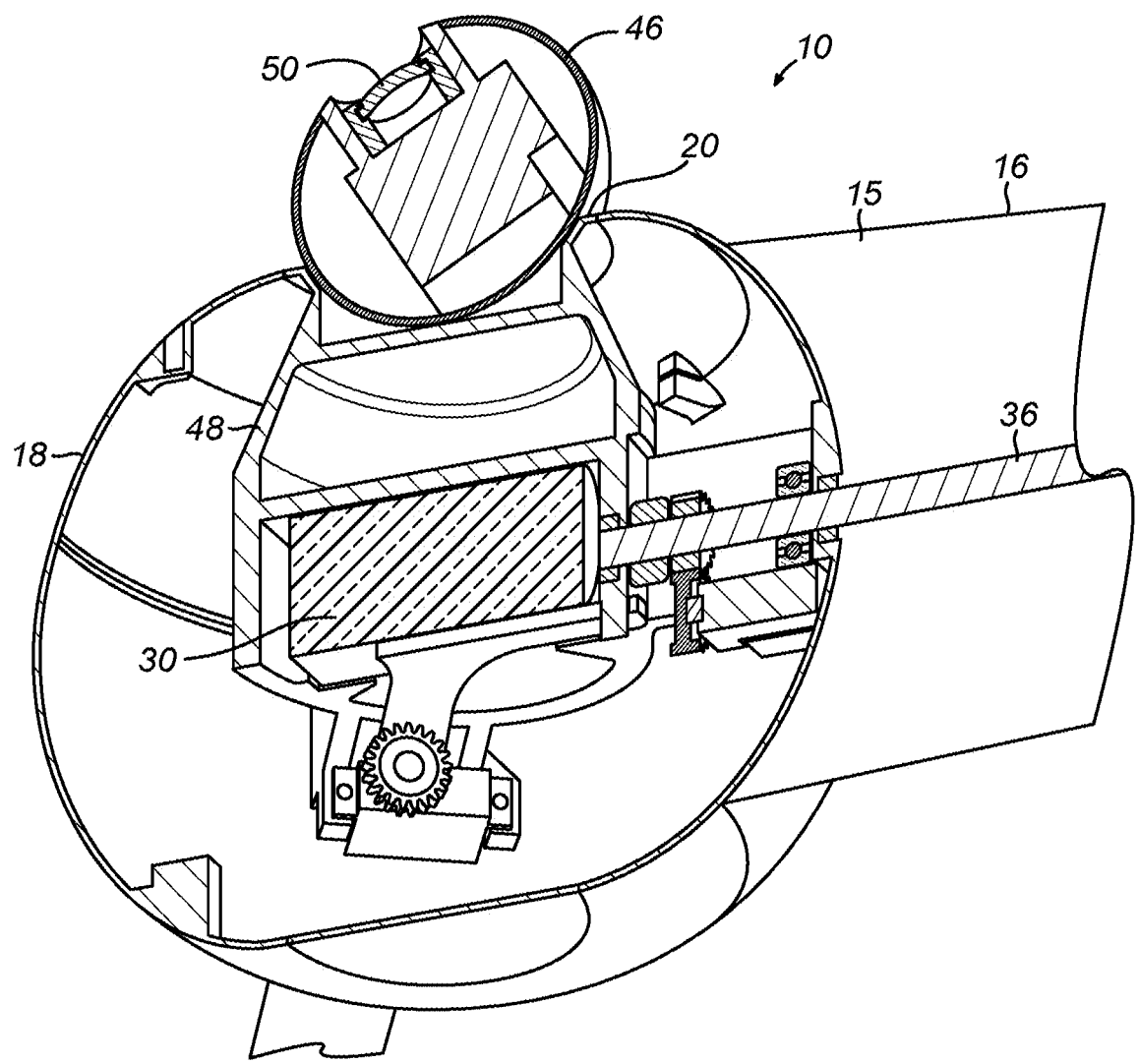
FIG. 8 is a partial cutaway perspective view of a camera and gimbal assembly of an embodiment of the vortex drone of FIG. 6.

In yet other embodiments, such as shown in FIGS. 8, a camera gimbal 46 can be mounted on the top hub cap 20. In such an embodiment, the top hub cap 20 may be designed to include a gimbal support 48 which can hold the camera gimbal 46. A camera 50 can then be carried by the camera gimbal 46. Although not shown, if present, the camera gimbal 46 may include additional wiring that can run to the battery 30 to power both the gimbal 46 and the camera 50. In one or more embodiments, if a plurality of vortex drones 10 are going to be in a stacked configuration, the uppermost vortex drone 10 can include a camera gimbal 46, such as shown in FIG. 2.

Figure 9:
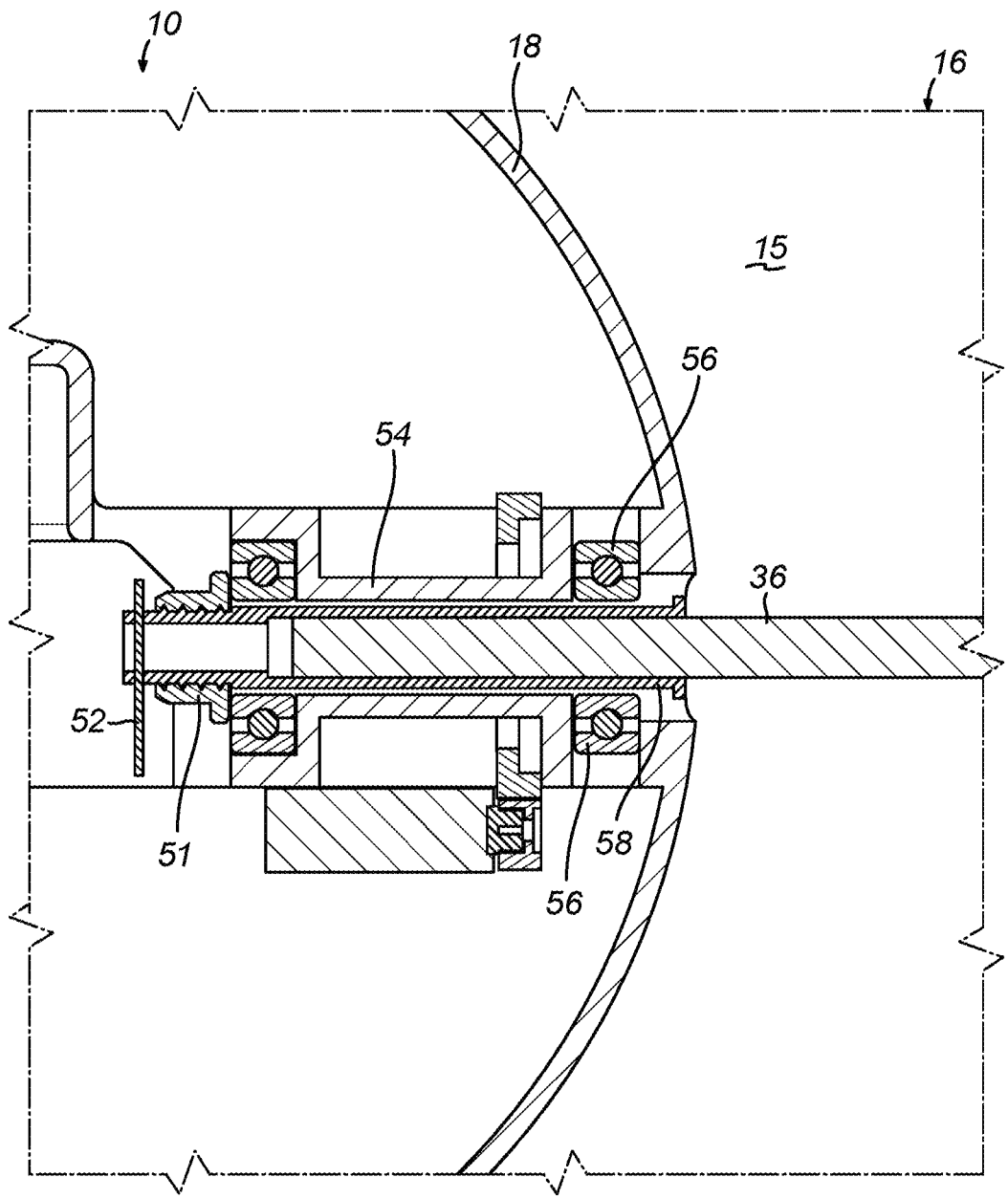
FIG. 9 is a partial cutaway perspective view of a wing of an embodiment of the vortex drone of FIG. 6 secured to the center hub with a quick exchange joint.

In one or more embodiments, each wing 16 of the vortex drone 10 may be secured to the center hub 18 with a quick exchange joint, as shown in detail in FIG. 9. The quick exchange joint includes a flanged locknut 51, a cotter pin 52, a spacer 54, two bearings 56, and an inner journal shaft 58. The end of the wing shaft 36 can be inserted into the inner journal shaft 58, the locknut 50 can be threaded onto the inner journal shaft 58, and the cotter pin 52 can be inserted as an anti-rotation feature. The quick exchange joint as discussed above allows for the quick insertion of a wing shaft 36 prior to takeoff or the quick replacement of a wing shaft 36 that has been damaged. Being able to utilize a quick exchange joint allows for transportation of a vortex drone 10 within a much smaller case than if the wings cannot be quickly removed when needing to transport the vortex drone 10.

Figure 10:
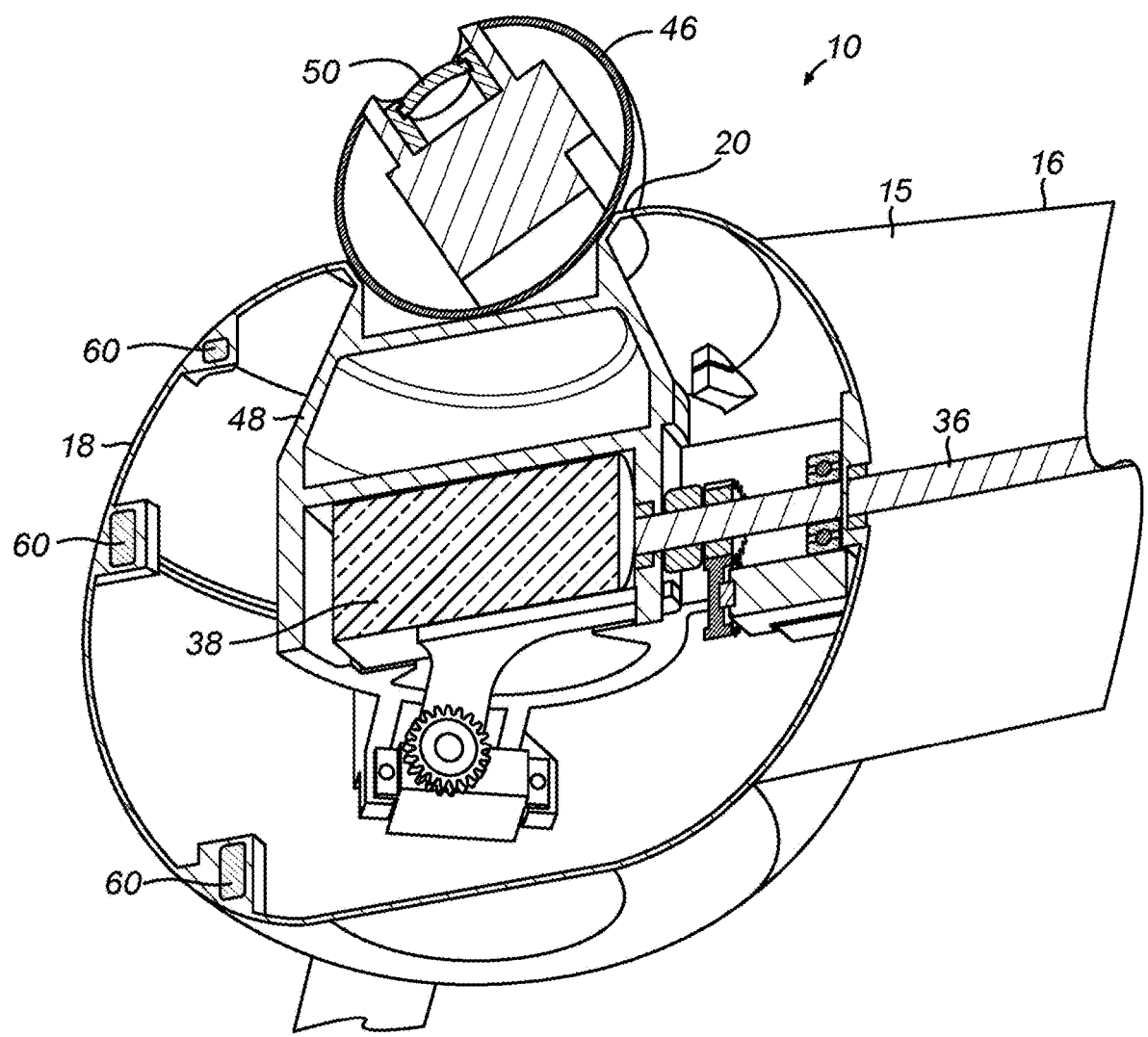
FIG. 10 is a partial cutaway perspective view of an embodiment of the vortex drone of FIG. 6 showing proximity sensors.

In one or more embodiments, as shown in FIG. 10, the center hub 18 includes a plurality of proximity sensors 60 on the top, side, and bottom of the center hub 18. These proximity sensors 60 give spatial intelligence for the control system to be able to utilize detect and avoid algorithms. In one or more embodiments, the proximity sensors 60 are selected from the group consisting of LiDAR sensors, ultrasonic sensors, or a combination thereof.

Figure 11:
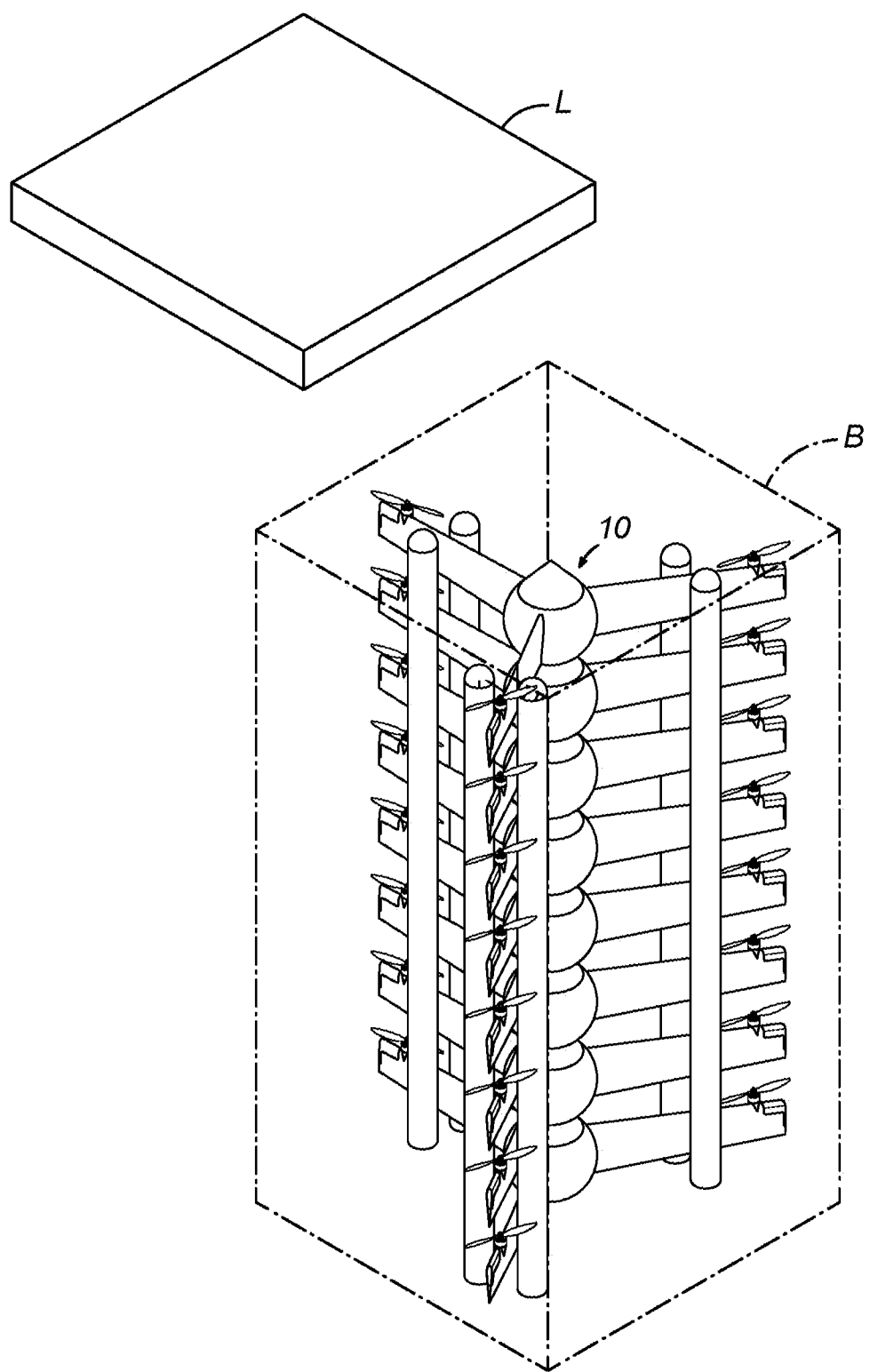
FIG. 11 is a perspective view of a plurality of vortex drones of the present disclosure being stacked together in a storage box/rapid deployment system.

In one or more embodiments, as shown in FIG. 11, a plurality of vortex drones 10 can be stacked together and shipped to a designated area in a cargo box B. The lid L of the cargo box B can be removed and the plurality of drones 10 can take off in tri-copter mode individually or attached to one another. In one or more embodiments, the drones 10 launch in sequential order once the lid has been removed. Current requests from the military for drone technology require a massive takeoff area. Having a stackable deployment method, such as shown in FIG. 11, changes the takeoff area for 100 drones from a football field to a flatbed truck, which may be advantageous for a plurality of reasons.

Figure 12:
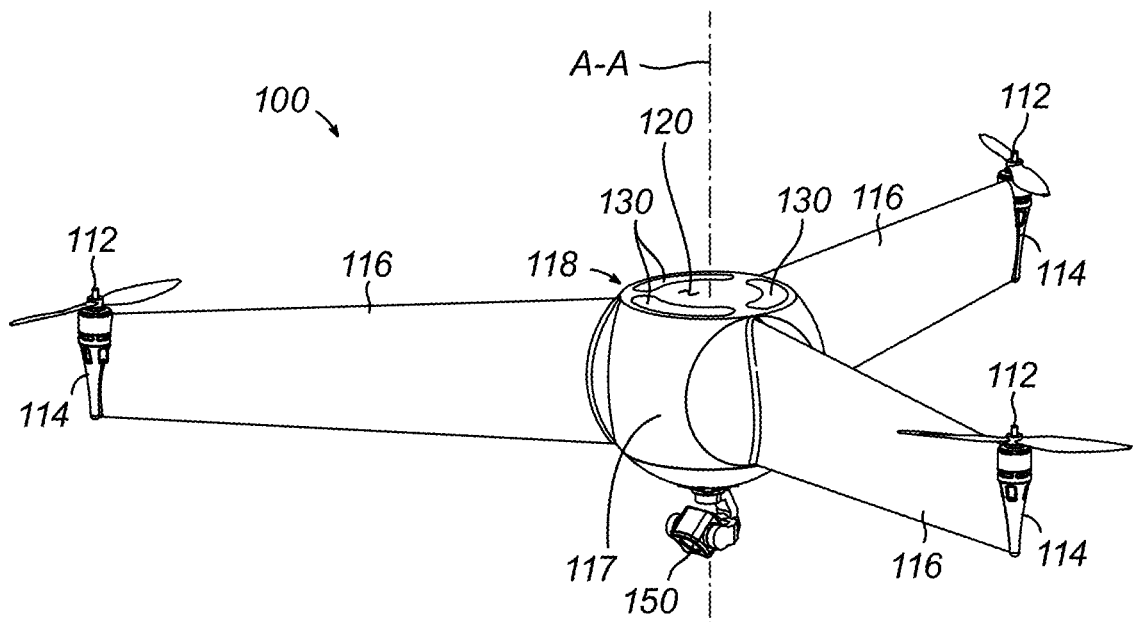
FIG. 12 is a perspective view of various external components of an embodiment of a vortex drone of the present disclosure.
Figure 13:
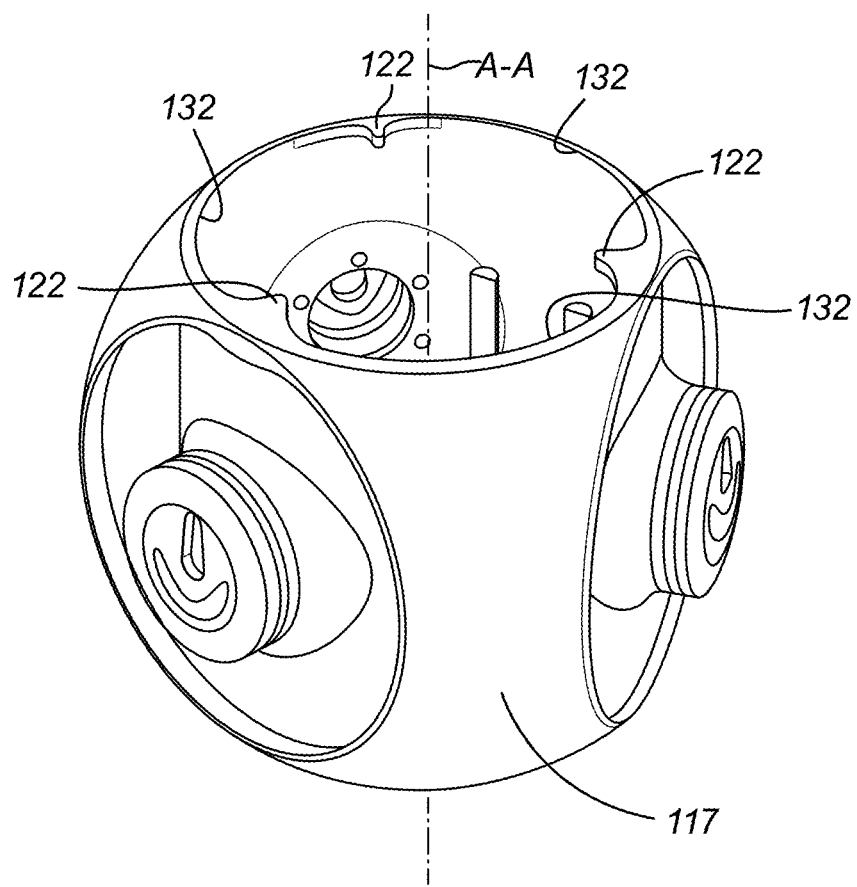
FIG. 13 is a perspective view of a center hub of the vortex drone of FIG. 12.

FIG. 12 shows details of various external components of a vortex drone 100 of the present disclosure. Vortex drone 100 may be equipped with one or more propeller systems 112 located adjacent to an end 114 of each wing 116 of vortex drone 100. Each wing 116 may be secured to a center hub 118. Vortex drone 100 further includes a plurality of battery packs 130 that slide vertically into an upper surface 120 of the center hub 118. Once the battery packs 130 are in place, they also provide a form of protection for additional internal components found within the center hub 118. In one or more embodiments, there are three battery packs 130 wherein each battery pack 130 contains 2 to 10 individual battery cells. In one or more embodiments, each battery back 130 contains 5 individual battery cells. In yet other embodiments, each battery back contains 6 individual battery cells. As can be seen in FIG. 13, beveled edges 122 of upper surface 120 of the center hub 118 form battery holders 132 that may allow for the battery packs 130 to fit with ease within main body 118.

Figure 14:
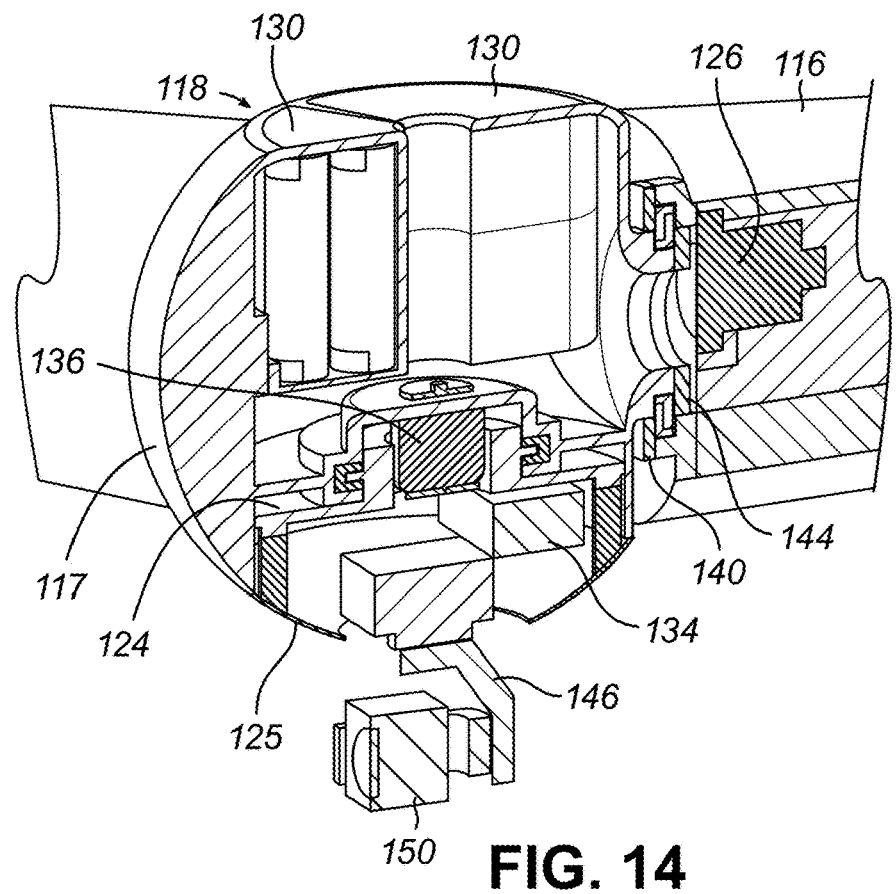
FIG. 14 is a partial cutaway perspective view of various internal components of the center hub and a wing of the vortex drone of FIG. 12.
Figure 15:
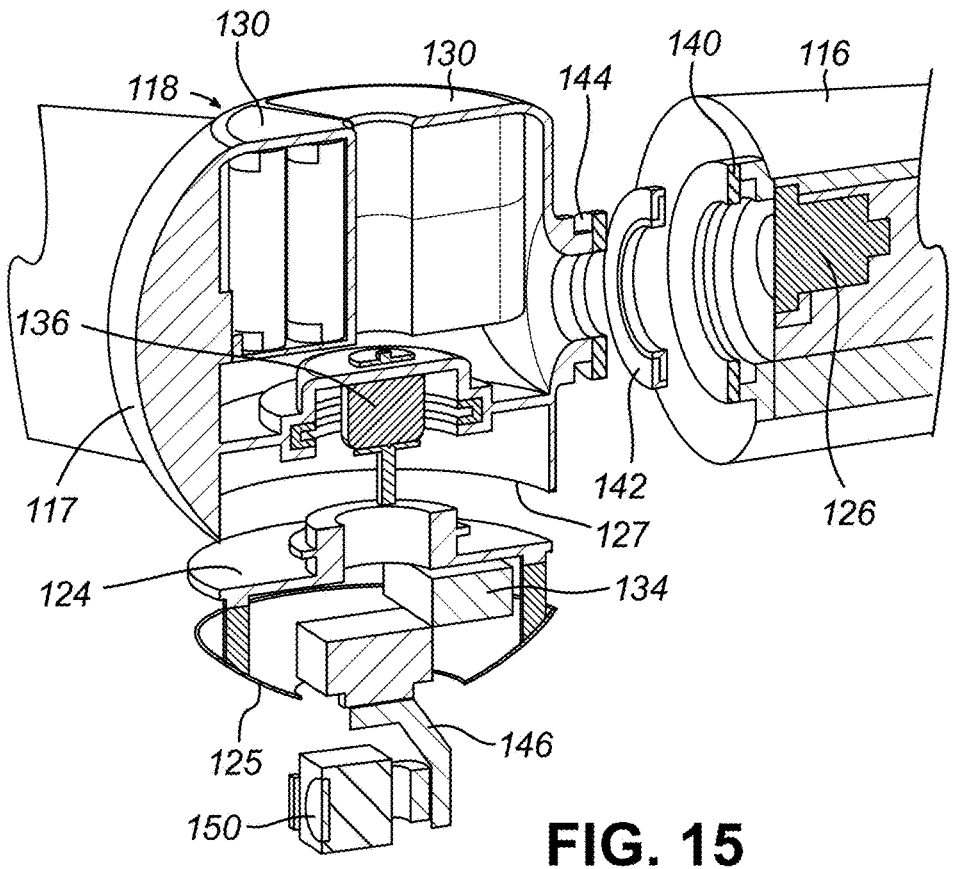
FIG. 15 is a partially exploded view of a partial cutaway perspective view of various internal components of the center hub and the wing of the vortex drone of FIG. 12.

FIGS. 14 and 15 show details of various internal components of a vortex drone 100. The center hub 118 comprises a main hub body 117 and a platform portion 124. The platform portion 124 may be located at a bottom of main hub body 117, wherein the platform portion 124 fits into an aperture 127 on the bottom of main hub body 117. Platform portion 124 additionally includes a bottom hub cap 125, utilized to protect the internal components found within the center hub 118. Within the center hub 118 can be a hub motor 136 which controls the movements of the gimbal 146 and the camera 150 as discussed in further detail below. The hub motor 136 may be powered by battery packs 130. As discussed above, the battery packs 130 may be held in place by the battery holders 132. In one or more embodiments, the flight management unit (FMU) 134 are needed to control the battery 30, the gimbal 146, the camera 150 and the actuator systems 126 found in each of the wings 116.

Included within the drone 100 is a communications air unit receiver (not shown) which can be the source of communication between the vortex drone 100 and the remote control (not shown) utilized to control the drone 100. Also utilized with the control system may be control algorithms. Further attached to the FMU 134 of drone 10 are various sensors, including accelerometers, gyroscopes, and GPS, which provide information about the position, orientation, and velocity of drone 100 at any point in time. The ground control system (remote control) may be used by the operator to send commands to the drone 100, such as instructions to take off, land, move in a certain direction, or adjust its altitude. Alternatively, the drone 100 can be autonomously controlled where the operator or swarm AI algorithms command the drone 100 to move from coordinate A to coordinate B, search along a designated flight path or area, return home, or other general commands. In one or more embodiments, the communication link between the drone 100 and the ground control unit may be a wireless radio frequency signal or wireless broadband communication signal, which allows for real-time transmission of data between the drone 100 and the ground control system.

The control algorithms used are responsible for processing the data from the sensors and the remote control to determine the appropriate actions for the drone 100 to take. These algorithms typically use a combination of feedback control and feedforward control techniques to maintain stability and achieve desired performance. Feedback control involves continuously measuring the current state of the drone 100 and comparing it to a desired state, then adjusting the actions of the drone 100 to reduce any error between the two states. Feedforward control involves anticipating the effects of external disturbances, such as wind or turbulence, and adjusting the actions of drone 100 accordingly to minimize their impact.

Each wing 116 includes an actuator system 126 including a male arm and a female interlock 144 that operate to independently control the angle of attachment of each wing 116 to center hub 118 and to operate and independently control each propeller system 112 found adjacent the end 114 of each wing 116. As shown in FIG. 15, each wing 116 includes a wing bushing end plate 140 and a wing bushing 142 which interacts with a hub-bushing end plate 144 found on the main hub body 117. Wing bushing 142 allows for ease of movement about the wing axis while keeping the wing 116 fixed to the main hub body 117 in all other degrees of freedom. In one or more embodiments, during vortex mode, the platform 124 does not rotate due to the hub motor 136 acting in a counter rotating manner. Therefore, regardless of the movement of the drone 100, the camera 150 secured to the gimbal 146 may not be out of position. Based on the various sensors discussed above, such as the accelerometer and magnetometers, the hub motor 136 can know how fast to spin and at what rate to keep the camera 150 steady.

Figure 16:
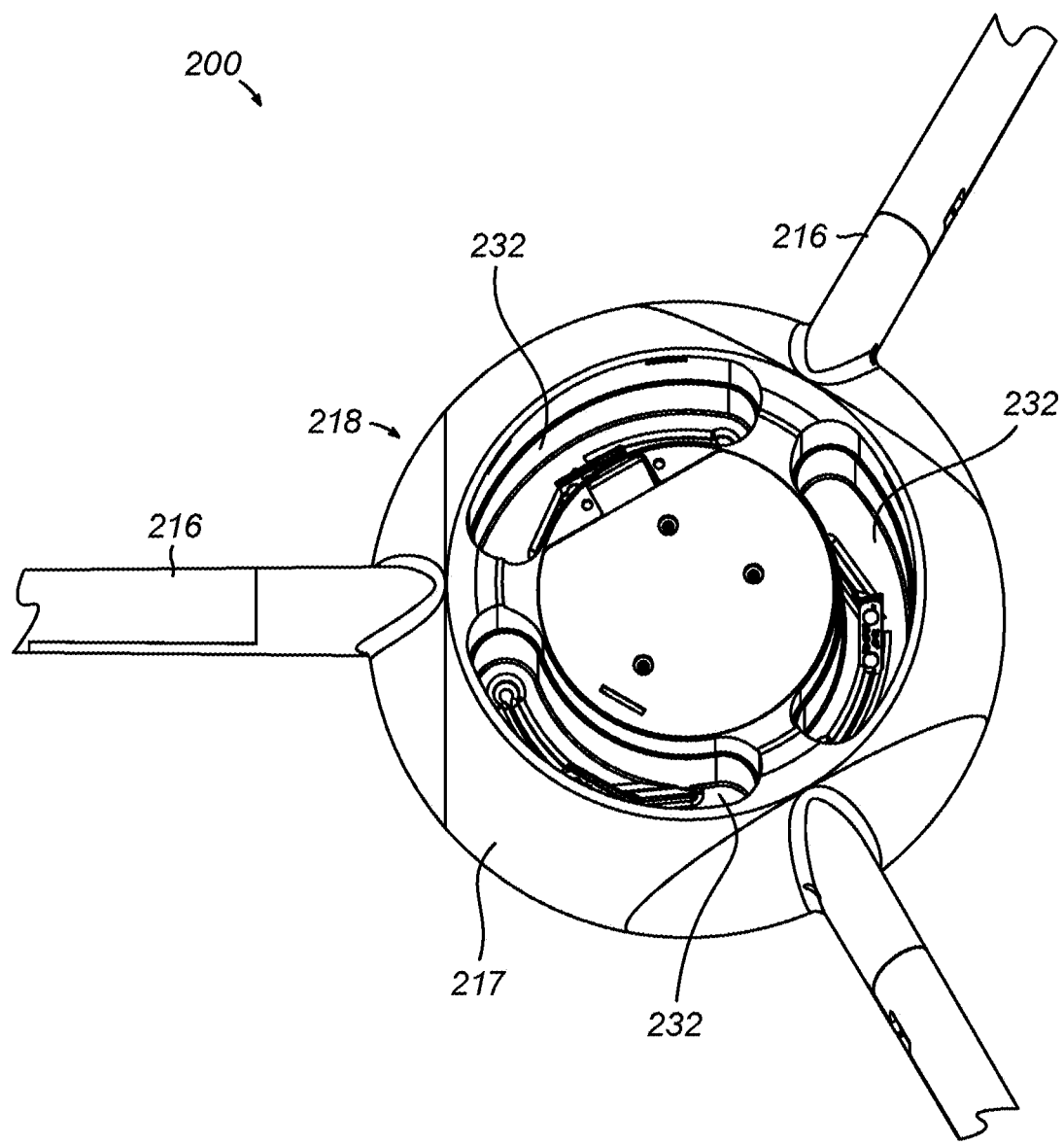
FIG. 16 is top perspective view of a vortex drone of the present disclosure without batteries installed.
Figure 17:
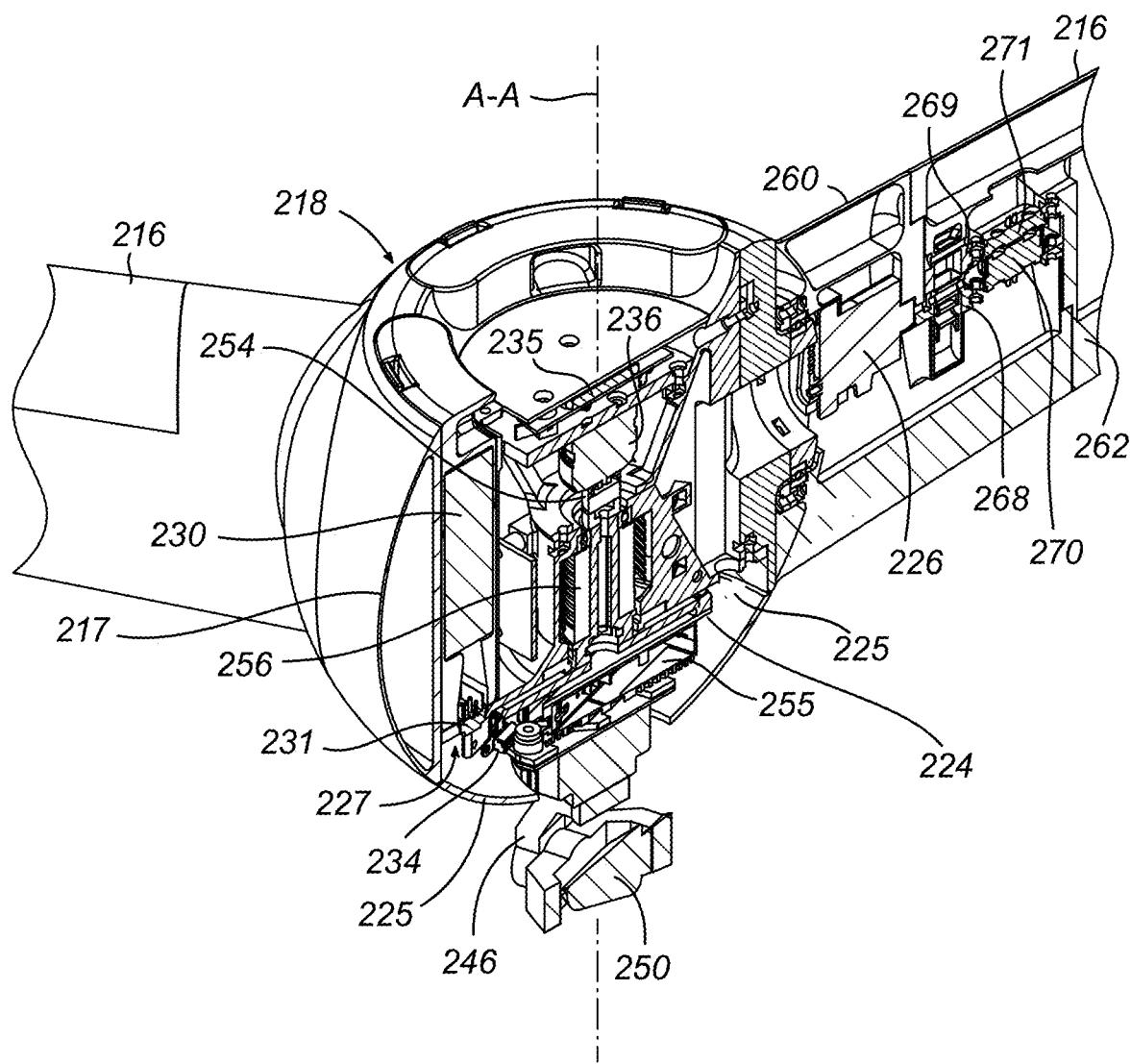
FIG. 17 is a partial cutaway perspective view of various internal components of a center hub and a wing of the vortex drone of FIG. 16.
Figure 18:
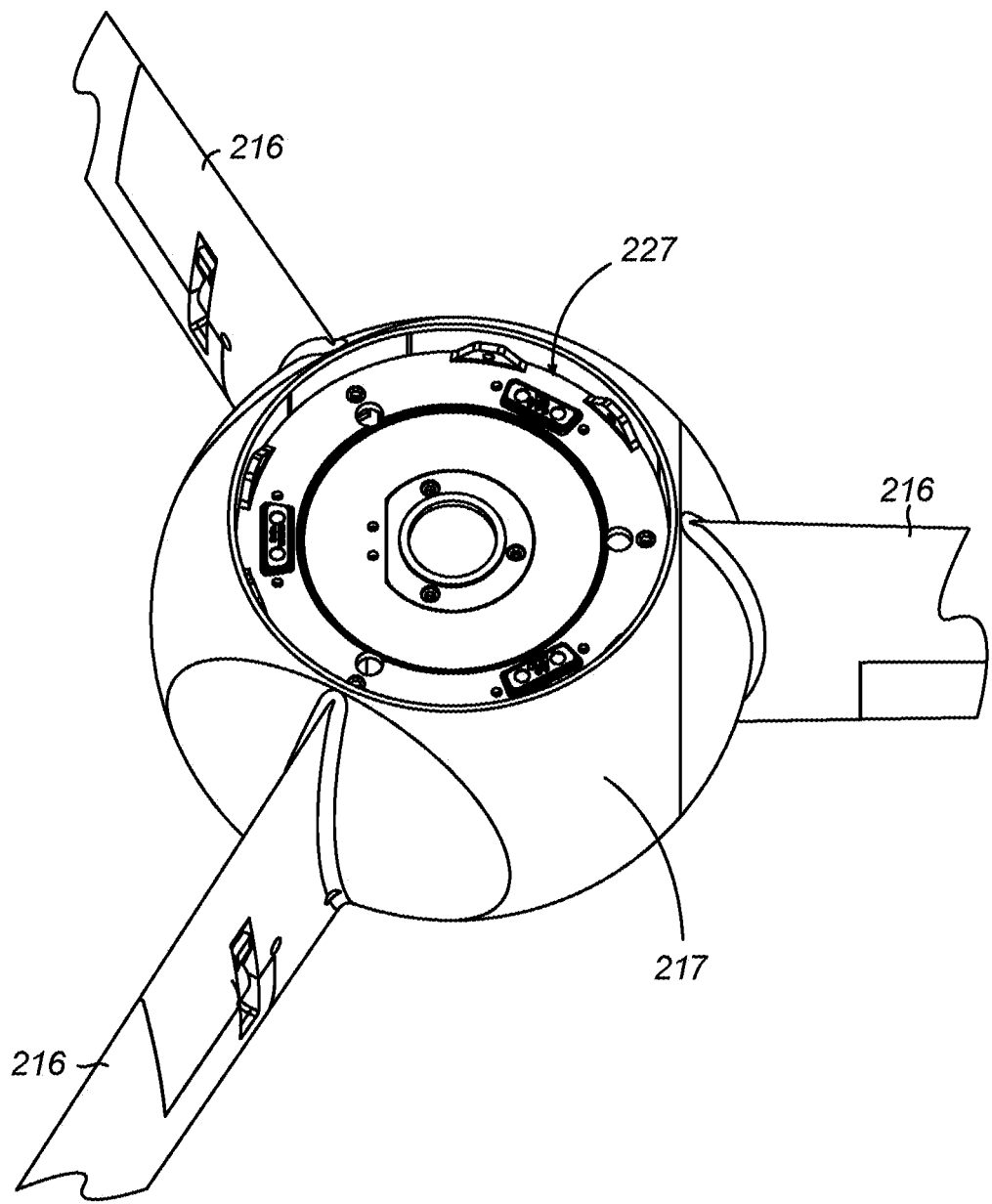
FIG. 18 is a bottom perspective view of a main hub body of the vortex drone of FIG. 16.
Figure 19:
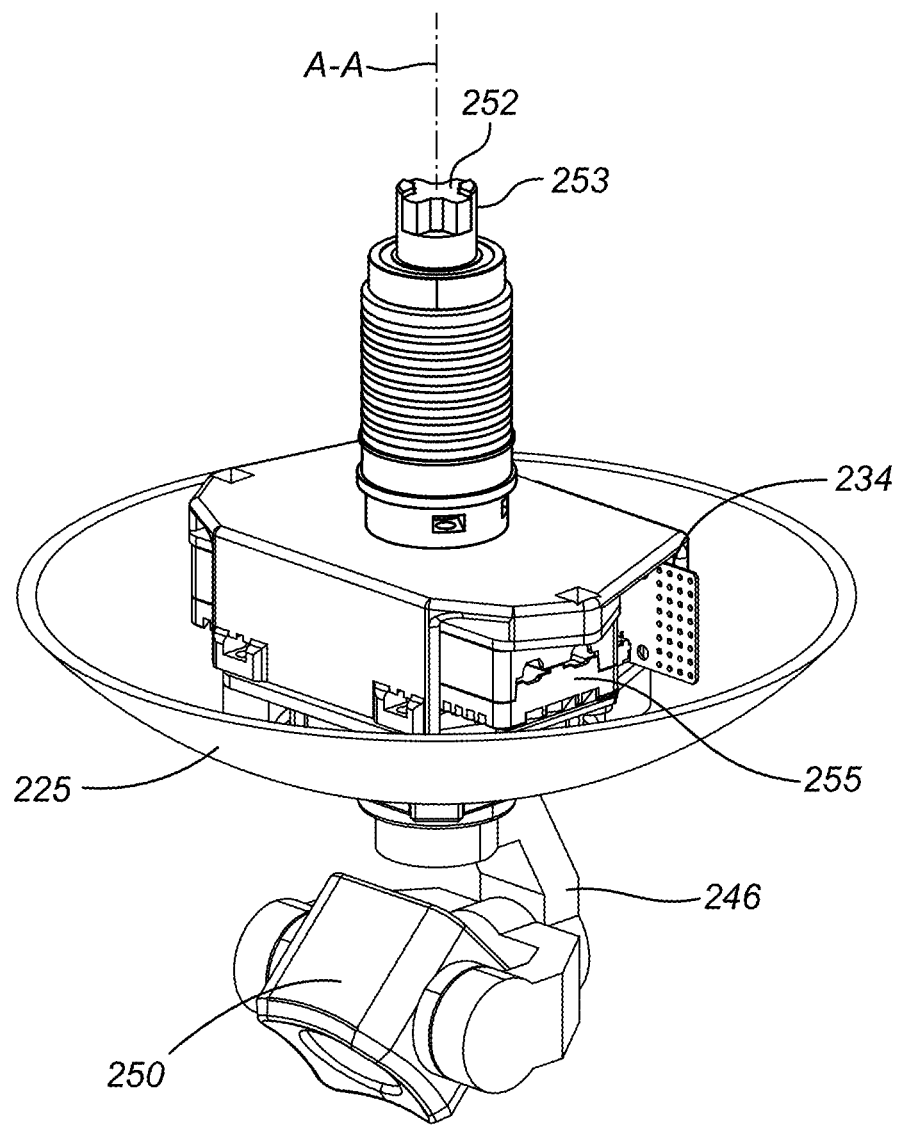
FIG. 19 is a perspective view of a platform portion of a center hub of the vortex drone of FIG. 16.

FIGS. 16 to 21 show various details of components of a vortex drone 200 of the present disclosure. As shown in FIG. 16, vortex drone 200 utilizes a slimmer design for battery holders 232 as compared to the batter holders 132 of vortex drone 100. This allows for more internal room for the internal components of vortex drone 200 which will be discussed in detail below. A center hub 218 includes a main hub body 217 and a platform portion 224. The platform portion 224 may be located at a bottom of main hub body 217, wherein the platform portion 224 fits into an aperture 227 on the bottom of main hub body 217. Platform portion 224 additionally includes a bottom hub cap 225, utilized to protect the internal components found within the center hub 218. Within the main hub body 217 may be a hub motor 236 which powers a flight management unit (FMU) 234, a GPS system 235, a gimble 246, and a camera 250 as will be discussed in further detail below. Although the FMU 234 is shown on the platform 224 and the GPS 235 is shown within the main hub body 217, the position of each component 234, 235 may be interchangeable between the platform 224 and the main hub body 217, and it may also be envisioned that each component 234, 235 can both be positioned with one of either the platform 224 or the main hub body 217. Vortex drone 200 also utilizes an air control unit 255 located on the platform 224 to assist with communications between the vortex drone 200 and the ground control system (remote control). Although shown as being located on the platform 224, it may also be contemplated that the air control unit 255 may be located within the main hub body 217.

The hub motor 236 may be powered by battery packs 230 which fit into the battery holders 232 and connect with battery connectors 231 located at a bottom of the battery holders 232. The platform 224 may be attached to the main hub body 217 with an axial female coupling 253 to a male coupling 252 located on platform 224 which connects to a female coupling 254 located within the main hub body 217. This coupling system allows the motor torque to be transmitted between the main hub body 217 and platform 224 without axial load overloading hub motor 236. Also, such a connection between the main hub body 217 and the platform 224 allows for the main hub body 217 to rotate in windmill mode while the platform 224 can counter-rotate while in windmill mode allowing the platform 224 to remain still while the main hub body rotates. As discussed above, the control system such as the FMU 234, the GPS system 235, the gimbal 246, the camera 250, and the air control unit 255 are dispersed between the platform 224 and the main hub body 217; therefore, vortex drone 200 includes a multi-channel slip ring 256 that connects the platform 224 and the main hub body 217 together so that the various elements of the control system can easily communicate with one another.

Figure 22:
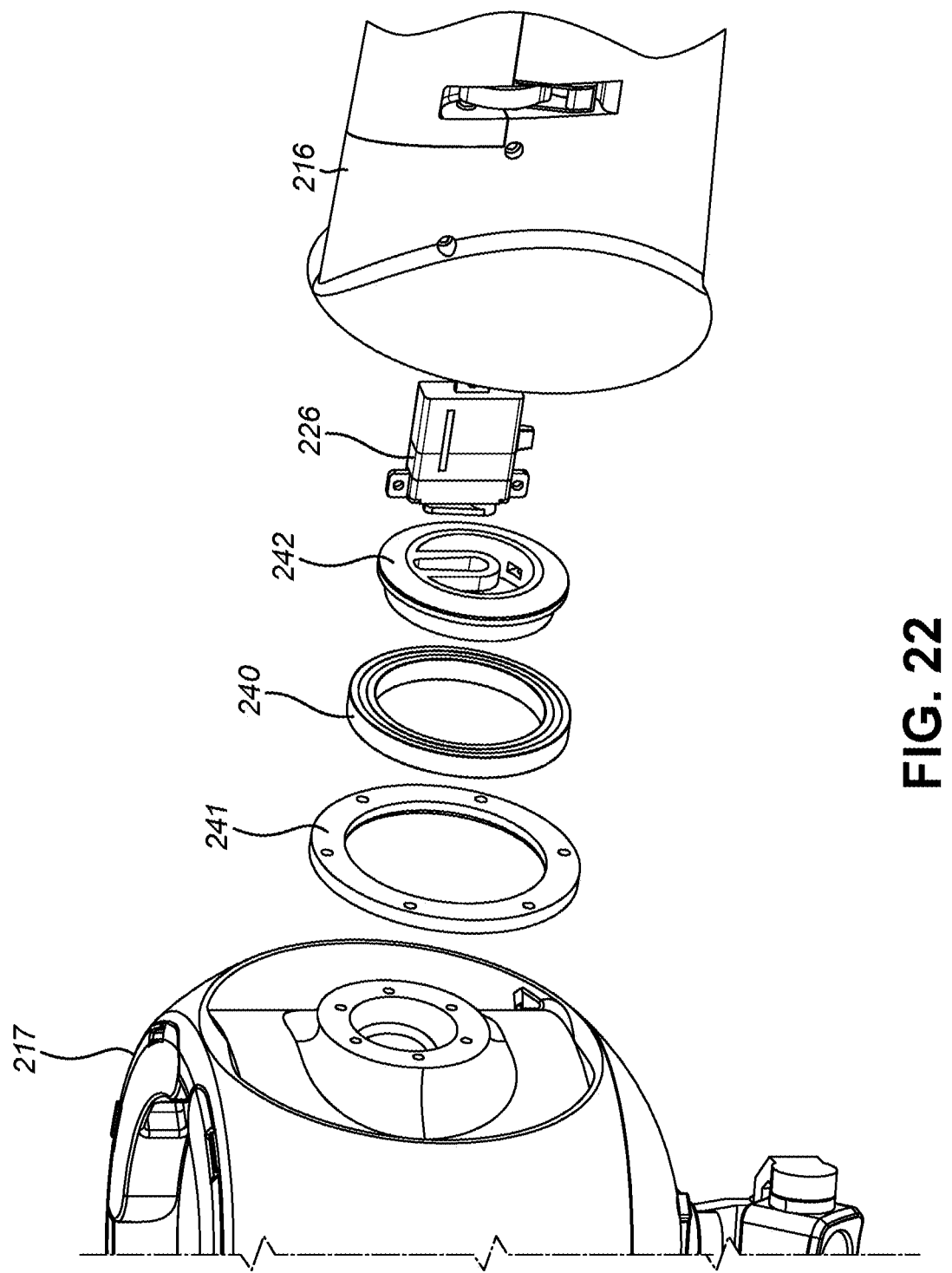
FIG. 22 is a partially exploded view of how a wing is secured to the center hub of the vortex drone of FIG. 16.

Each wing 216 includes an actuator system 226 including a male arm and a female interlock that operate to independently control the angle of attachment of each wing 216 to center hub 218 and to operate and independently control each propeller system 212 found adjacent an end 214 of each wing 216. FIG. 22 shows an exploded view of how wings 216 are secured to the main hub body 217. A wing bearing end plate 241 fits around a ball bearing 240 while a hub bearing end plate 242 fits within ball bearing 240. The hub bearing end plate 242 also interacts with the actuator system 226 secured within wing 216 while the wing bearing end plate 241 also interacts with the main hub body 217.

Figure 20:
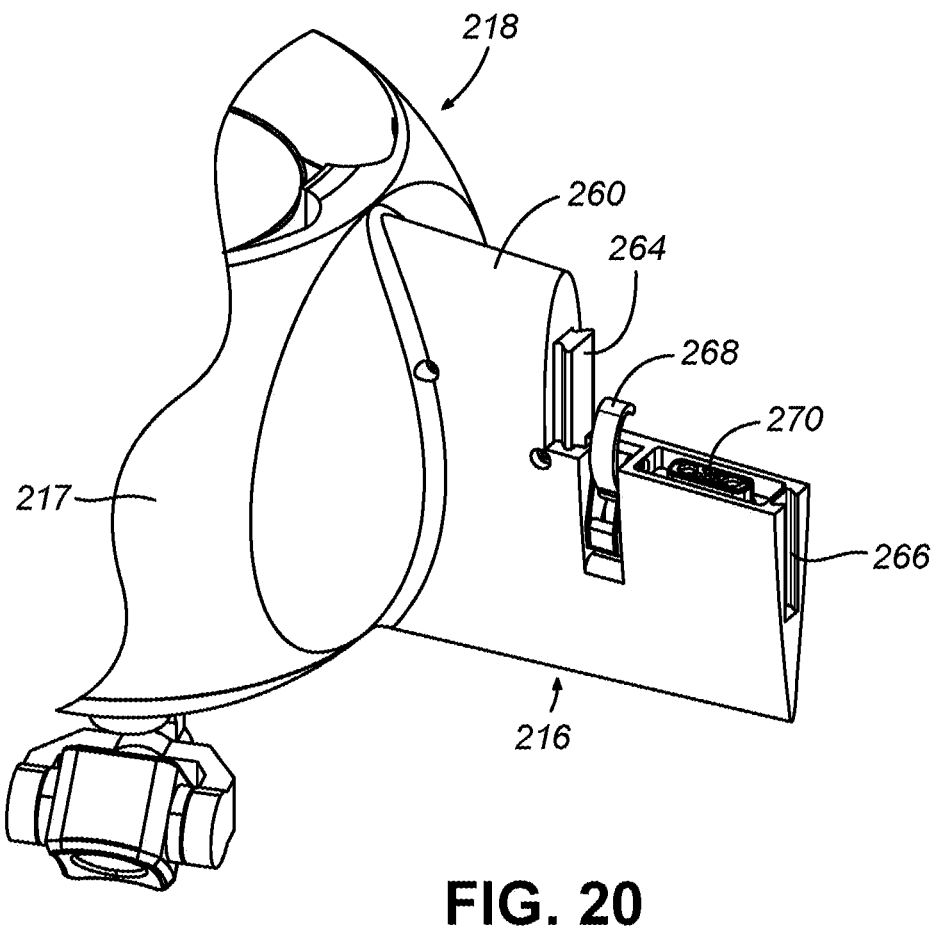
FIG. 20 is a perspective view of a proximal portion of a wing of the vortex drone of FIG. 16.
Figure 21:
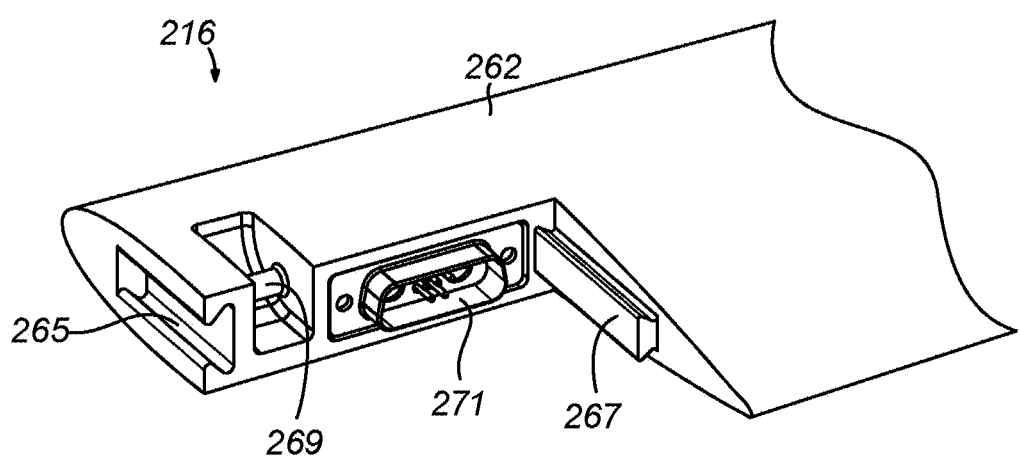
FIG. 21 is a perspective view of a distal portion of a wing of the vortex drone of FIG. 16.

As can be seen in more detail with FIGS. 20 and 21, each wing 216 of vortex drone 200 may be broken down into two main component parts, namely a proximal portion 260 and a distal portion 262. The wings 216 need to withstand high radial (centrifugal) loads while also having high transverse (bending) loads. Typical wing attachments only need to worry about high radial loads. To overcome these issues, wings 216 utilize a double dovetail mechanism. Specifically, the proximal portion 260 of each wing 216 includes a first male dovetail 264 and a second female dovetail 266, and the distal portion 262 of each wing 216 includes a first female dovetail 265 and a second male dovetail 267. The first male dovetail 264 interacts with the first female dovetail 265 while the second female dovetail 266 interacts with the second male dovetail 267 to secure the proximal portion 260 and the distal portion 262 of each wing 216 together. This double-dovetail mechanism has a large amount of radial space between the dovetail pairings 264/265 and 266/267 to provide a moment arm between the dovetail pairings 264/265 and 266/267 to withstand torque from aerodynamic bending loads, while also withstanding high centrifugal loads.

The dovetail pairings 264/265 and 266/267 slide axially front to back during assembly. As an added means of security, the proximal portion 260 also includes a clip 268 that interacts with a latch 269 on the distal portion 262. It may also be contemplated that the proximal portion 260 could contain the latch 269 while the distal portion 262 contains the clip 268. To provide an electrical connection between the proximal portion 260 and the distal portion 262, the proximal portion 260 includes a female electrical connector 270, and the distal portion 262 contains a male electrical connector 271. It may also be contemplated that the proximal portion 260 could contain the male electrical connector 271 while the distal portion 262 contains the female electrical connector 270. An electrical connection may be needed because the actuator system 226 may be located within the proximal portion 260 while the one or more propeller systems may be located on the distal portion 262.

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An unmanned aerial vehicle comprising: a center hub having a central axis; a plurality of wings, wherein each wing of the plurality of wings is defined by a base securable to the center hub; one or more propeller systems located on each wing of the plurality of wings; one or more actuator systems, wherein each of the one or more propeller systems is independently associated with one actuator system of the one or more actuator systems; a power source located within the interior of the center hub; and a control system located within the interior of the center hub operatively configured to control the one or more actuator systems, the one or more actuator systems, and the power source; wherein the unmanned aerial vehicle has a first position wherein the base of each wing of the plurality of wings is positioned on the center hub at an angle offset from the central axis of the center hub; and a second position wherein the base of each wing of the plurality of wings is positioned on the center hub at an angle parallel with the central axis of the center hub;

and wherein the unmanned aerial vehicle is operatively configured to transition from the first position to the second position.

Example 2

The unmanned aerial vehicle of Example 1, comprising three wings securable to the center hub and a single propeller system located on each of the three wings.

Example 3

The unmanned aerial vehicle of Example 1, wherein the power source comprising one or more battery packs.

Example 4

The unmanned aerial vehicle of Example 3, wherein the center hub further comprises one or more battery holders configured to house the one or more battery packs.

Example 5

The unmanned aerial vehicle of Example 1, wherein the one or more actuator systems are each independently located within a wing of the plurality of wings.

Example 6

The unmanned aerial vehicle of Example 5, wherein each actuator system of the one or more actuator systems comprises a servo motor and a servo gear.

Example 7

The unmanned aerial vehicle of Example 1, further comprising a gimbal system secured to the center hub; a camera system secured to the gimbal system; and a hub motor located within an interior of the center hub operatively configured to control the gimble gimbal system and the camera system.

Example 8

The unmanned aerial vehicle of Example 7, wherein the control system is further operatively configured to control the hub motor, the gimbal system, and the camera system.

Example 9

The unmanned aerial vehicle of Example 7, wherein the center hub further comprises a main hub body and a platform operatively configured to fit into an aperture on the main hub body.

Example 10

The unmanned aerial vehicle of Example 9, wherein the gimbal system is operatively configured to be secured to the platform.

Example 11

The unmanned aerial vehicle system of Example 9, wherein the main hub body further comprises one of a male or female coupling system, and wherein the platform includes the other of the male or female coupling system such that the main hub body and the platform are operatively connected by the male coupling system coupling with the female coupling system.

Example 12

The unmanned aerial vehicle system of Example 11, wherein the control system comprises a flight management system, a global position system, and a radio signal air control unit; and wherein the flight management system, the global position system, and the radio signal transmitter are located either within the main hub body or on the platform.

Example 13

The unmanned aerial vehicle system of Example 12, further comprising a multi-channel slip ring, wherein the multi-channel slip ring allows for communication between the main hub body and the platform.

Example 14

The unmanned aerial vehicle system of Example 1, wherein each wing of the plurality of wings comprises a proximal portion and a distal portion, wherein the proximal portion includes the base fixedly secured to the center hub and wherein the distal portion is removably secured to the proximal portion.

Example 15

The unmanned aerial vehicle of Example 14, wherein each proximal portion of each wing of the plurality of wings includes a first male dovetail and a second female dovetail, wherein each removal portion of each wing of the plurality of wings includes a first female dovetail and a second male dovetail, and wherein the first male dovetail interacts with the first female dovetail and the second female dovetail interacts with the second male dovetail to removably secure the proximal portion to the distal portion.

Example 16

The unmanned aerial vehicle of Example 15, wherein each proximal portion of each wing of the plurality of wings includes one of a clip or a latch, wherein each distal portion of each wing of the plurality of wings includes the other of the clip or the latch, and wherein the clip is removably securable to the latch to removably secure the proximal portion to the distal portion.

Example 17

The unmanned aerial vehicle of Example 16, wherein each proximal portion of each wing of the plurality of wings includes one of a female electrical connector or a male electrical connector, wherein each distal portion of each wing of the plurality of wings includes the other of the female electrical connector of the male electrical connector, and wherein the female electrical connector is removably securable to the male electrical connector to provide an electrical connection between the proximal portion and the distal portion.

Example 18

The unmanned aerial vehicle of Example 1, further comprising a camera system secured to the center hub and a hub motor located within an interior of the center hub operatively configured to control the camera system.

Example 19

The unmanned aerial vehicle of claim 18, wherein the control system is further operatively configured to control the hub motor and the camera system.

It should be understood that any of the versions of the unmanned aerial vehicle described herein may include various other features in addition to or in lieu of those described above. By way of example only, any of the unmanned aerial vehicles described herein may also include one or more of the various features disclosed in any of the various references that are incorporated by reference herein. It should also be understood that the teachings herein may be readily applied to any of the unmanned aerial vehicles described in any of the other references cited herein, such that the teachings herein may be readily combined with the teachings of any of the references cited herein in numerous ways. Other types of unmanned aerial vehicles into which the teachings herein may be incorporated will be apparent to those of ordinary skill in the art.

It should also be understood that any ranges of values referred to herein should be read to include the upper and lower boundaries of such ranges. For instance, a range expressed as ranging "between approximately 1.0 inches and approximately 1.5 inches" should be read to include approximately 1.0 inches and approximately 1.5 inches, in addition to including the values between those upper and lower boundaries.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

What is claimed is:

1. An unmanned aerial vehicle system comprising:
   a center hub having a central axis;
   a plurality of wings, each wing of the plurality of wings having a base securable to the center hub;
   one or more propeller systems located on each wing of the plurality of wings;
   one or more actuator systems, each of the one or more propeller systems being independently associated with one actuator system of the one or more actuator systems;
   a power source located within an interior of the center hub; and
   a control system located within the interior of the center hub, the control system being operatively configured to control (a) the one or more actuator systems, (b) the one or more propeller systems, and (c) the power source, the unmanned aerial vehicle having (A) a first position, the base of each wing of the plurality of wings being positioned on the center hub at an angle offset from the central axis of the center hub, and (B) a second position, the base of each wing of the plurality of wings being positioned on the center hub at an angle parallel with the central axis of the center hub, the unmanned aerial vehicle being operatively configured to transition from the first position to the second position, each wing of the plurality of wings comprising a proximal portion and a distal portion, the proximal portion including the base fixedly secured to the center hub and the distal portion being removably secured to the proximal portion, and
   (I) each proximal portion of each wing of the plurality of wings including a first male dovetail and a second female dovetail, each distal portion of each wing of the plurality of wings including a first female dovetail and a second male dovetail, the first male dovetail interacting with the first female dovetail and the second female dovetail interacting with the second male dovetail to removably secure the proximal portion to the distal portion,
   (II) each proximal portion of each wing of the plurality of wings including one of a clip and a latch, each distal portion of each wing of the plurality of wings including the other of the clip and the latch, the clip being removable securable to the latch to removably secure the proximal portion to the distal portion, and
   (III) each proximal portion of each wing of the plurality of wings including one of a female electrical connector and a male electrical connector, each distal portion of each wing of the plurality of wings including the other of the female electrical connector and the male electrical connector, the female electrical connector being removably securable to the male electrical connector to provide an electrical connection between the proximal portion and the distal portion.

2. The unmanned aerial vehicle of claim 1, further comprising:
   a main hub body, and a platform operatively configured to fit into an aperture on the main hub body.

3. The unmanned aerial vehicle of claim 1, comprising three wings securable to the center hub and a single propeller system located on each of the three wings.

4. The unmanned aerial vehicle of claim 1, wherein the power source comprising one or more battery packs.

5. The unmanned aerial vehicle of claim 4, wherein the center hub further comprises one or more battery holders configured to house the one or more battery packs.

6. The unmanned aerial vehicle of claim 1, wherein the one or more actuator systems are each independently located within a wing of the plurality of wings.

7. The unmanned aerial vehicle of claim 6, wherein each actuator system of the one or more actuator systems comprises a servo motor and a servo gear.

8. The unmanned aerial vehicle of claim 2, further comprising (a) a gimbal system secured to the center hub; (b) a camera secured to the gimbal system; and (c) a hub motor located within an interior of the center hub operatively configured to control movement of the gimbal system and the camera.

9. The unmanned aerial vehicle of claim 8, wherein the control system is further operatively configured to control the hub motor, the gimbal system, and the camera.

10. The unmanned aerial vehicle of claim 8, wherein the gimbal system is operatively configured to be secured to the platform.

11. The unmanned aerial vehicle system of claim 2, wherein the control system comprises a flight management system, a global position system, and a radio signal air control unit; and wherein the flight management system, the global position system, and the radio signal air control unit, are located (i) within the main hub body or (ii) on the platform.

12. The unmanned aerial vehicle system of claim 11, further comprising a multi-channel slip ring allowing for communication between the main hub body and the platform.

13. The unmanned aerial vehicle of claim 1, further comprising a camera secured to the center hub and a hub motor located within an interior of the center hub operatively configured to control movement of the camera.

14. The unmanned aerial vehicle of claim 13, wherein the control system is further operatively configured to control the hub motor and the camera.

15. The unmanned aerial vehicle of claim 2, wherein (a) the main hub body comprises one of a male and axial female coupling system and a female coupling system, and (b) the platform includes the other of the male and axial female coupling system and the female coupling system, such that the main hub body and the platform are operatively connected by the male and axial female coupling system with the female coupling system.

16. A method associated with the unmanned aerial vehicle of claim 1, the method comprising forming, controlling, and/or using the unmanned arial vehicle.

* * * * *